(12) United States Patent
Uratani et al.

(10) Patent No.: US 9,478,012 B2
(45) Date of Patent: Oct. 25, 2016

(54) DISPLAY APPARATUS, SOURCE DEVICE AND DISPLAY SYSTEM

(71) Applicant: SHARP KABUSHIKI KAISHA, Osaka-shi, Osaka (JP)

(72) Inventors: Osamu Uratani, Osaka (JP); Seiji Imanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 22 days.

(21) Appl. No.: 14/330,678

(22) Filed: Jul. 14, 2014

(65) Prior Publication Data

US 2015/0091945 A1    Apr. 2, 2015

(30) Foreign Application Priority Data

Sep. 30, 2013    (JP) .................... 2013-203494

(51) Int. Cl.
*G06T 3/60*    (2006.01)

(52) U.S. Cl.
CPC *G06T 3/60* (2013.01); *G06T 3/606* (2013.01)

(58) Field of Classification Search
None
See application file for complete search history.

(56) References Cited

U.S. PATENT DOCUMENTS

| | | | | |
|---|---|---|---|---|
| 8,120,625 B2* | 2/2012 | Hinckley | ............ | G06F 1/1626 345/659 |
| 2009/0237420 A1* | 9/2009 | Lawrenz | ............ | G06F 1/1601 345/649 |
| 2012/0050331 A1* | 3/2012 | Kanda | ................ | G06F 3/1454 345/649 |
| 2012/0327106 A1* | 12/2012 | Won | .................... | G06F 3/04883 345/619 |
| 2014/0002389 A1* | 1/2014 | Kim | ..................... | G06F 3/1446 345/173 |
| 2014/0009394 A1* | 1/2014 | Lee | ..................... | H04N 5/4403 345/157 |
| 2014/0055494 A1* | 2/2014 | Mikawa | ................ | G06T 3/60 345/649 |
| 2016/0027150 A1* | 1/2016 | Lee | ..................... | G06F 1/1626 345/650 |

FOREIGN PATENT DOCUMENTS

| | | |
|---|---|---|
| JP | 2003-296701 A | 10/2003 |
| JP | 2005-221634 A | 8/2005 |
| JP | 2005-321516 A | 11/2005 |
| JP | 2007-325144 A | 12/2007 |

* cited by examiner

*Primary Examiner* — Chante Harrison
(74) *Attorney, Agent, or Firm* — Birch, Stewart, Kolasch & Birch, LLP

(57) ABSTRACT

A display apparatus includes an orientation detecting portion, a receiving portion and an image processing portion. The orientation detecting portion detects an orientation of an upper part or a lower part of a display screen of a display portion. The receiving portion receives an image signal transmitted from a source device and state information (information showing an orientation of an upper part or a lower part of the transmission image indicated by the image signal and presence/absence of black band parts). The image processing portion applies, to the transmission image, rotation processing such that the orientation of the upper part or the lower part of the display screen coincides with the orientation of the upper part or the lower part of the transmission image, scaling processing, and/or black-band processing for adding or removing black band parts, according to a detection result of the orientation detecting portion and the state information.

4 Claims, 13 Drawing Sheets

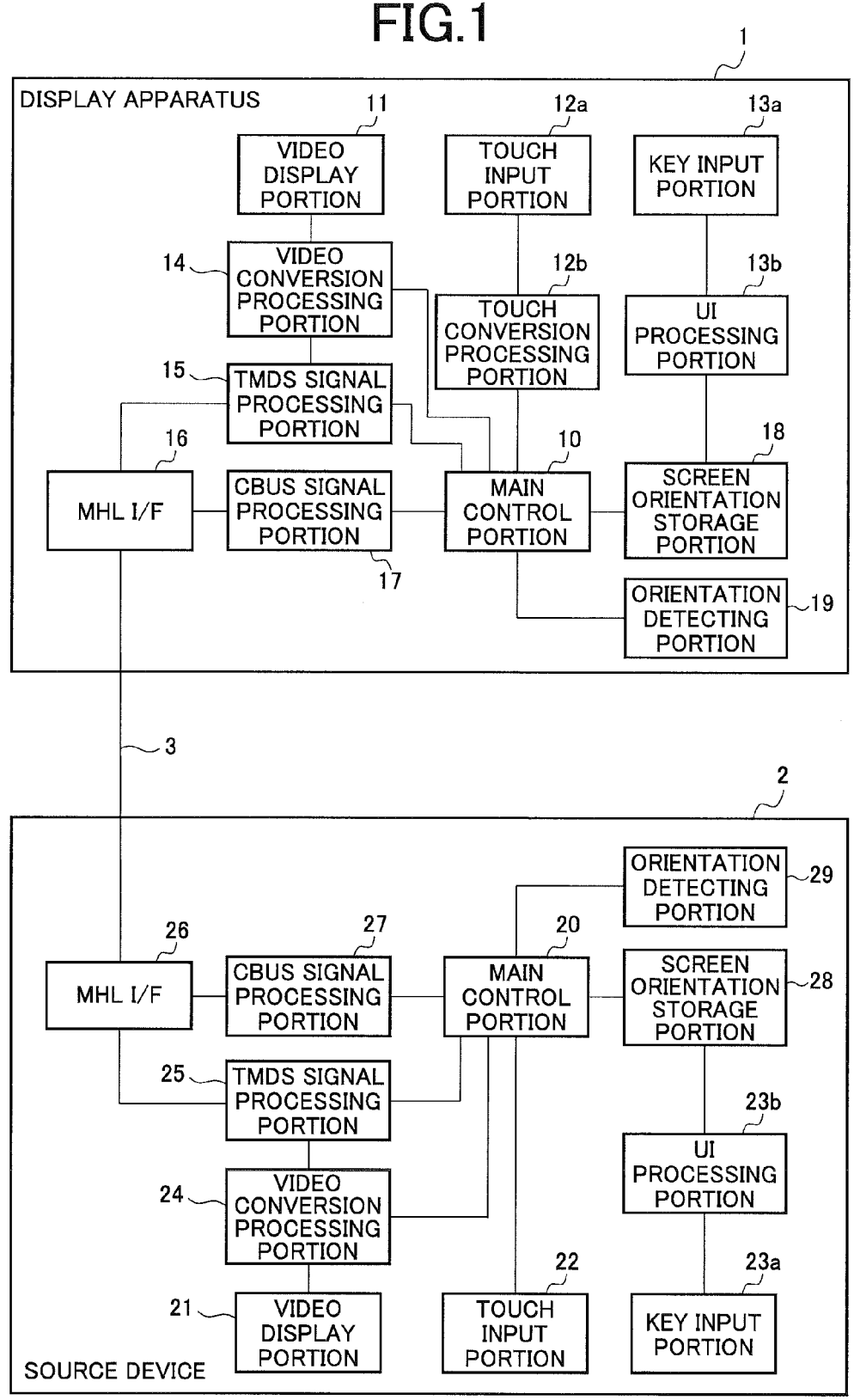

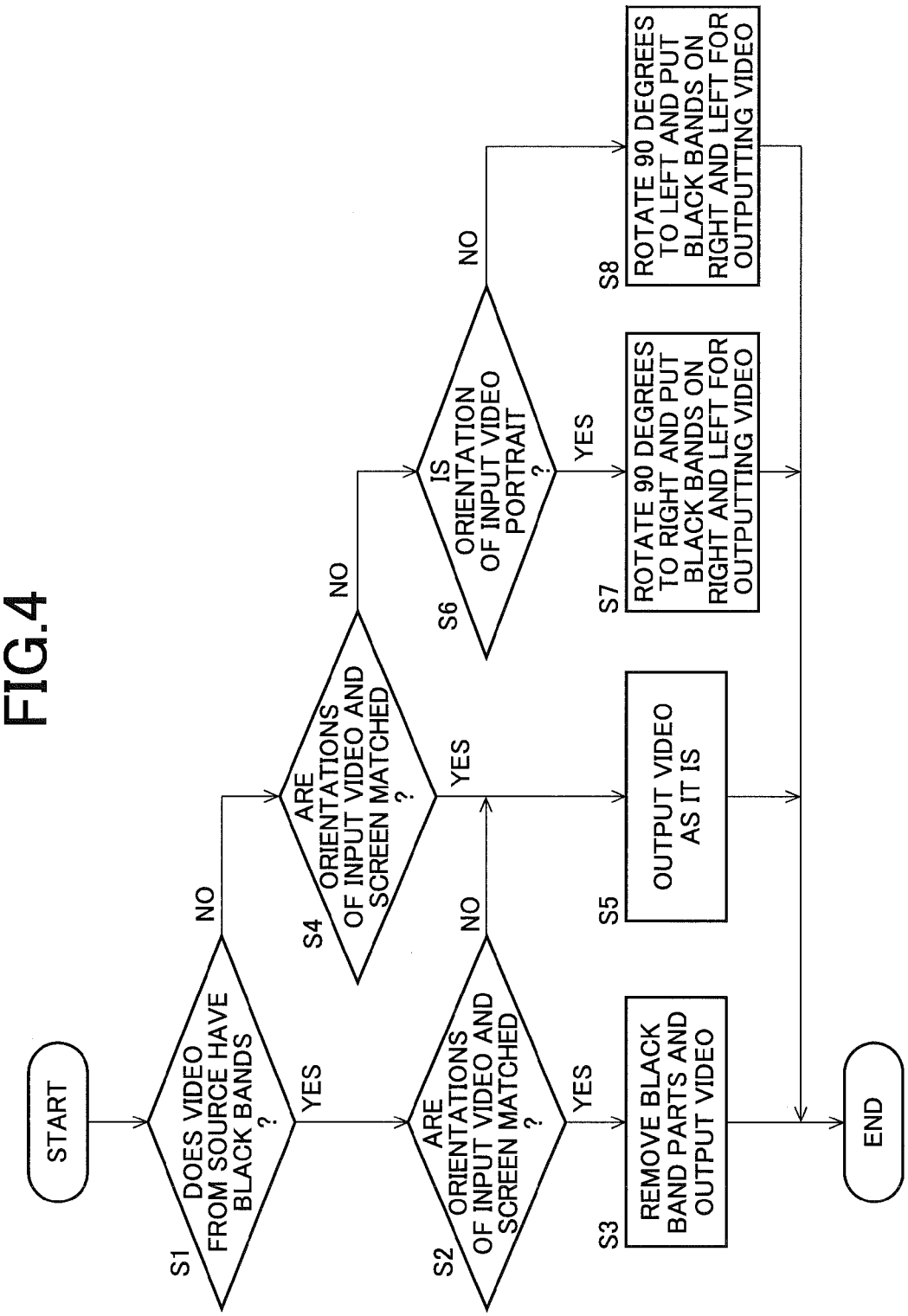

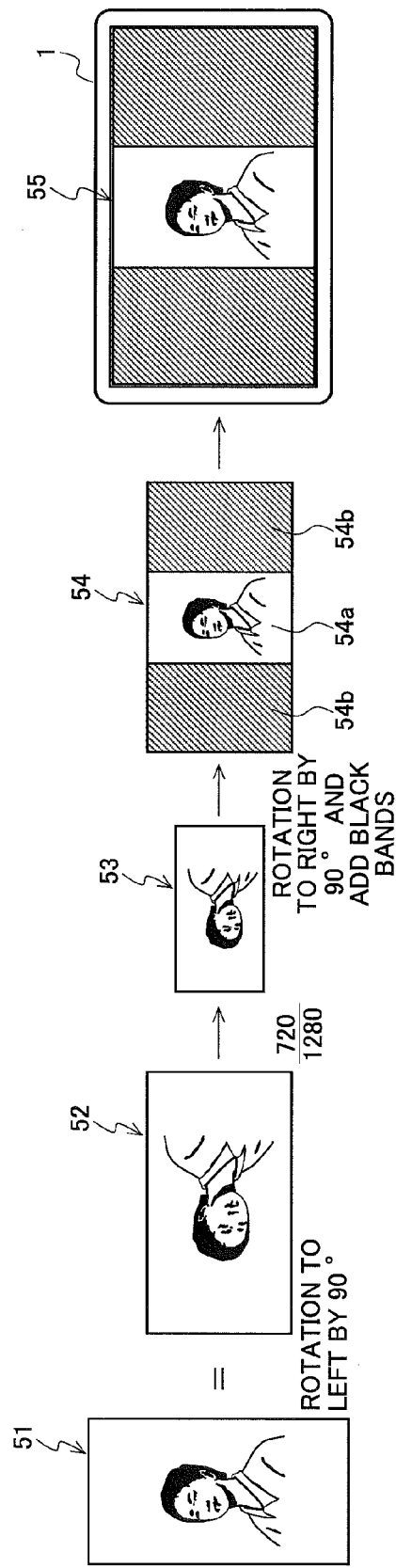

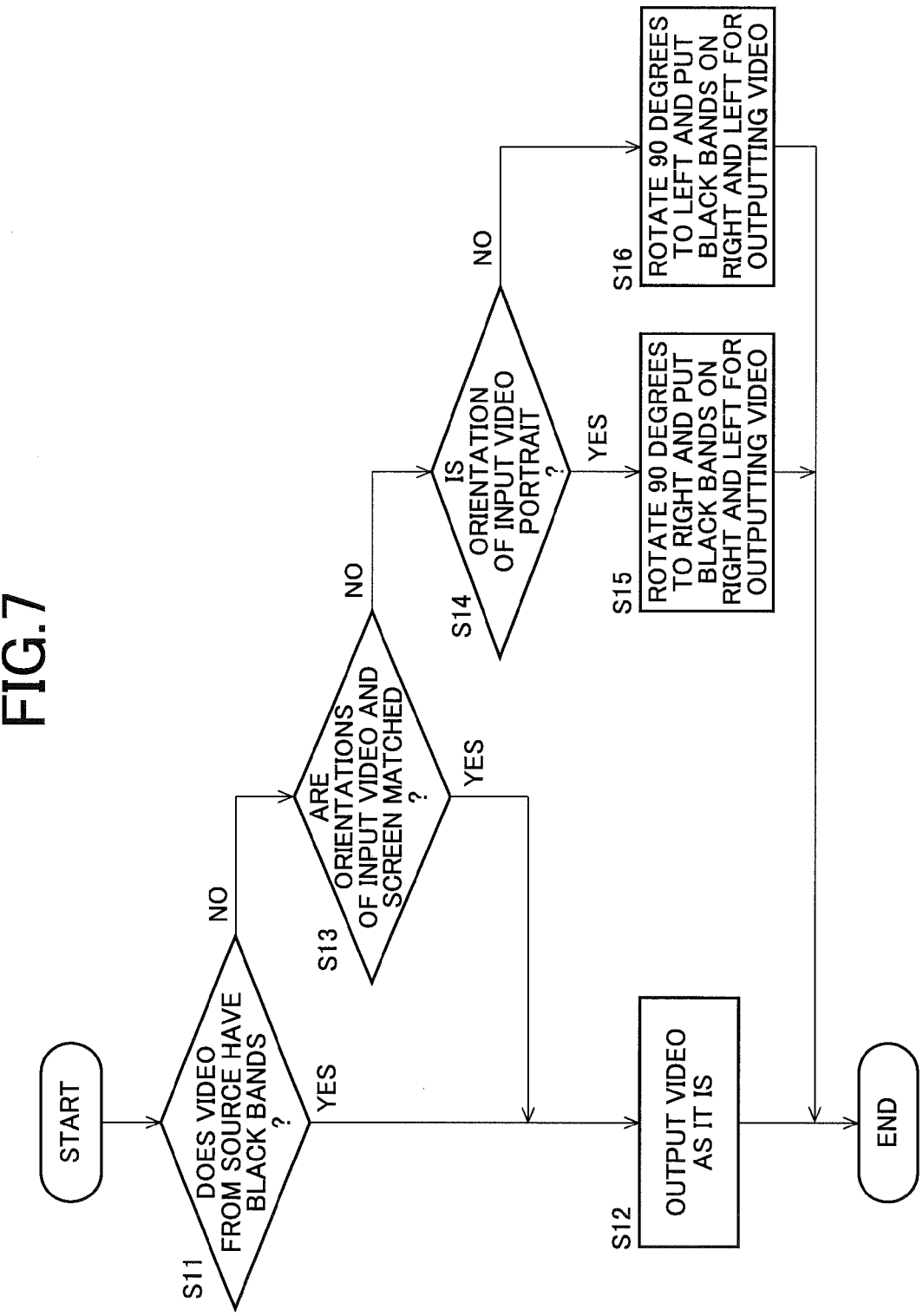

FIG.8A

| DISPLAY APPARATUS | | SOURCE DEVICE | | | | |
|---|---|---|---|---|---|---|
| NOTIFICATION WITH NEGOTIATION PACKET | | STATE OF INSIDE OF SOURCE DEVICE | | NOTIFICATION WITH NEGOTIATION PACKET | | OUTPUT SCREEN FROM SOURCE DEVICE |
| FLAG FOR SETTING LENGTH AND WIDTH OF DISPLAY APPARATUS SIDE | CAPABILITY FLAG OF DISPLAY APPARATUS SIDE | LENGTH AND WIDTH SETTING MENU OF SOURCE DEVICE SIDE | ORIENTATION OF APPLICATION (ORIENTATION SETTING) | LENGTH AND WIDTH FLAG OF SOURCE DEVICE SIDE | FLAG OF OUTPUT SCREEN | |
| NO SETTING (0) | ONLY FULL-SCREEN (0) | LANDSCAPE-FIXED | VERIABLE | LANDSCAPE-FIXED (1) | LANDSCAPE (0) | FIG.2A |
| | | | LANDSCAPE-FIXED | | LANDSCAPE (0) | FIG.2A |
| | | | PORTRAIT-FIXED | | LANDSCAPE (0) | FIG.2B |
| | | PORTRAIT-FIXED | VERIABLE | PORTRAIT-FIXED (2) | PORTRAIT (1) | FIG.2A |
| | | | LANDSCAPE-FIXED | | PORTRAIT (1) | FIG.2C |
| | | | PORTRAIT-FIXED | | PORTRAIT (1) | FIG.2A |
| | FULL SCREEN PORTRAIT+ BLACK BANDS ON RIGHT AND LEFT (1) | LANDSCAPE-FIXED | VERIABLE | LANDSCAPE-FIXED (1) | LANDSCAPE (0) | FIG.2A |
| | | | LANDSCAPE-FIXED | | LANDSCAPE (0) | FIG.2A |
| | | | PORTRAIT-FIXED | | PORTRAIT (1)★ | FIG.2A |
| | | PORTRAIT-FIXED | VERIABLE | PORTRAIT-FIXED (2) | PORTRAIT (1) | FIG.2A |
| | | | LANDSCAPE-FIXED | | PORTRAIT (1) | FIG.2C |
| | | | PORTRAIT-FIXED | | PORTRAIT (1) | FIG.2A |
| | FULL SCREEN LANDSCAPE+ BLACK BANDS ON TOP AND BOTTOM (2) | LANDSCAPE-FIXED | VERIABLE | LANDSCAPE-FIXED (1) | LANDSCAPE (0) | FIG.2A |
| | | | LANDSCAPE-FIXED | | LANDSCAPE (0) | FIG.2A |
| | | | PORTRAIT-FIXED | | LANDSCAPE (0) | FIG.2B |
| | | PORTRAIT-FIXED | VERIABLE | PORTRAIT-FIXED (2) | PORTRAIT (1) | FIG.2A |
| | | | LANDSCAPE-FIXED | | LANDSCAPE (0)◆ | FIG.2A |
| | | | PORTRAIT-FIXED | | PORTRAIT (1) | FIG.2A |
| | FULL SCREEN PORTRAIT + BLACK BANDS ON RIGHT AND LEFT LANDSCAPE + BLACK BANDS ON TOP AND BOTTOM (3) | LANDSCAPE-FIXED | VERIABLE | LANDSCAPE-FIXED (1) | LANDSCAPE (0) | FIG.2A |
| | | | LANDSCAPE-FIXED | | LANDSCAPE (0) | FIG.2A |
| | | | PORTRAIT-FIXED | | PORTRAIT (1)★ | FIG.2A |
| | | PORTRAIT-FIXED | VERIABLE | PORTRAIT-FIXED (2) | PORTRAIT (1) | FIG.2A |
| | | | LANDSCAPE-FIXED | | LANDSCAPE (0)◆ | FIG.2A |
| | | | PORTRAIT-FIXED | | PORTRAIT (1) | FIG.2A |
| | (WHEN BOTH HAVE NO LENGTH AND WIDTH SETTING, REGARDLESS OF CAPABILITY FLAG, FULL-SCREEN DISPLAY IS PERFORMED WITH DISPLAY STATE OF SOURCE DEVICE REMAINED) | NO SETTING | VERIABLE | NO SETTING (0) | ORIENTATION OF SOURCE DEVICE | FIG.2A |
| | | | LANDSCAPE-FIXED | | LANDSCAPE (0) | FIG.2A |
| | | | PORTRAIT-FIXED | | PORTRAIT (1) | FIG.2A |

FIG.8B

| DISPLAY APPARATUS | | | SOURCE DEVICE | | | |
|---|---|---|---|---|---|---|
| NOTIFICATION WITH NEGOTIATION PACKET | | | NOTIFICATION WITH NEGOTIATION PACKET | | | OUTPUT SCREEN FROM SOURCE DEVICE |
| FLAG FOR SETTING LENGTH AND WIDTH OF DISPLAY APPARATUS SIDE | CAPABILITY FLAG OF DISPLAY APPARATUS SIDE | STATE OF INSIDE OF SOURCE DEVICE | | LENGTH AND WIDTH FLAG OF SOURCE DEVICE SIDE | FLAG OF OUTPUT SCREEN | |
| | | LENGTH AND WIDTH SETTING MENU OF SOURCE DEVICE SIDE | ORIENTATION OF APPLICATION (ORIENTATION SETTING) | | | |
| WIDTH (1) | ONLY FULL-SCREEN (0) | NO SETTING | VERIABLE | NO SETTING (0) | LANDSCAPE (0) | FIG.2A |
| | | | LANDSCAPE-FIXED | NO SETTING (0) | LANDSCAPE (0) | FIG.2A |
| | | | PORTRAIT-FIXED | NO SETTING (0) | LANDSCAPE (0) | FIG.2B |
| | FULL SCREEN PORTRAIT+ BLACK BANDS ON RIGHT AND LEFT (1) | NO SETTING | VERIABLE | NO SETTING (0) | LANDSCAPE (0) | FIG.2A |
| | | | LANDSCAPE-FIXED | NO SETTING (0) | LANDSCAPE (0) | FIG.2A |
| | | | PORTRAIT-FIXED | NO SETTING (0) | PORTRAIT (1) ★ | FIG.2A |
| | FULL SCREEN LANDSCAPE+ BLACK BANDS ON TOP AND BOTTOM (2) | NO SETTING | VERIABLE | NO SETTING (0) | LANDSCAPE (0) | FIG.2A |
| | | | LANDSCAPE-FIXED | NO SETTING (0) | LANDSCAPE (0) | FIG.2A |
| | | | PORTRAIT-FIXED | NO SETTING (0) | LANDSCAPE (0) | FIG.2B |
| | FULL SCREEN PORTRAIT + BLACK BANDS ON RIGHT AND LEFT LANDSCAPE + BLACK BANDS ON TOP AND BOTTOM (3) | NO SETTING | VERIABLE | NO SETTING (0) | LANDSCAPE (0) | FIG.2A |
| | | | LANDSCAPE-FIXED | NO SETTING (0) | LANDSCAPE (0) | FIG.2A |
| | | | PORTRAIT-FIXED | NO SETTING (0) | PORTRAIT (1) ★ | FIG.2A |
| LENGTH (2) | ONLY FULL-SCREEN (0) | NO SETTING | VERIABLE | NO SETTING (0) | PORTRAIT (1) | FIG.2C |
| | | | LANDSCAPE-FIXED | NO SETTING (0) | PORTRAIT (1) | FIG.2C |
| | | | PORTRAIT-FIXED | NO SETTING (0) | PORTRAIT (1) | FIG.2A |
| | FULL SCREEN PORTRAIT+ BLACK BANDS ON RIGHT AND LEFT (1) | NO SETTING | VERIABLE | NO SETTING (0) | PORTRAIT (1) | FIG.2C |
| | | | LANDSCAPE-FIXED | NO SETTING (0) | PORTRAIT (1) | FIG.2C |
| | | | PORTRAIT-FIXED | NO SETTING (0) | PORTRAIT (1) | FIG.2A |
| | FULL SCREEN LANDSCAPE+ BLACK BANDS ON TOP AND BOTTOM (2) | NO SETTING | VERIABLE | NO SETTING (0) | LANDSCAPE (0)◆ | FIG.2A |
| | | | LANDSCAPE-FIXED | NO SETTING (0) | PORTRAIT (1) | FIG.2A |
| | FULL SCREEN PORTRAIT + BLACK BANDS ON RIGHT AND LEFT LANDSCAPE + BLACK BANDS ON TOP AND BOTTOM (3) | NO SETTING | VERIABLE | NO SETTING (0) | LANDSCAPE (0)◆ | FIG.2A |
| | | | PORTRAIT-FIXED | | PORTRAIT (1) | FIG.2A |

DISPLAY APPARATUS, SOURCE DEVICE AND DISPLAY SYSTEM

CROSS-NOTING PARAGRAPH

This non-provisional application claims priority under 35 U.S.C. §119(a) on Patent Application No. 2013-203494 filed in JAPAN on Sep. 30, 2013, the entire contents of which are hereby incorporated herein by reference.

FIELD OF THE INVENTION

The present invention relates to a display apparatus, a source device and a display system, and more specifically to a display apparatus that displays an image transmitted from a source device, the source device and a display system provided with the display apparatus and the source device.

BACKGROUND OF THE INVENTION

Some mobile terminal apparatuses such as a smartphone, a mobile PC (Personal Computer) and a tablet terminal are provided with a video output terminal of a High-Definition Multimedia Interface (HDMI: registered trademark, the same hereinafter) specification or a Mobile High-definition Link (MHL: registered trademark, the same hereinafter) specification, and configured so as to be able to output an image (still image or moving image) to an external display apparatus via the terminal, that is, to function as a source device.

Moreover, such a mobile terminal apparatus detects a vertical direction (vertical direction of a display screen) of the apparatus by an embedded sensor, and performs control to rotate an image that is displayed on a display screen 90° according to a change in the detection result, thereby a vertical direction of the image when viewed from a user is fixed at all times.

Thus, basically, two screen configurations of portrait and landscape exist in such a mobile terminal apparatus. However, since the HDMI specification and the MHL specification are specifications premising a landscape output image as a format having a size of 1280×720 pixels, an aspect ratio of 16:9 and the like, a landscape image is provided at all times at a time of image output in a mobile terminal apparatus that employs these specifications. Note that, even an HDMI adapter compatible with a wireless specification Miracast premises that an output image is landscape in the same manner. Accordingly, a landscape image is output as it is and a portrait image is output after being added with black band parts on right and left to an external display apparatus.

Moreover, Japanese Laid-Open Patent Publication No. 2005-221634 discloses a technology that in an image display apparatus provided with a storage portion that stores image data and processing conditions including a processing size of the image data, information of a type, a size, and an aspect ratio of the image data is acquired from the storage portion, whether or not the acquired size matches the above-described processing size is judged, and when the both do not match, the image data is subjected to processing under the above-described processing conditions.

However, since a size and an aspect ratio of an image that is transferred with the HDMI specification or the MHL specification from a mobile terminal apparatus are fixed to be landscape, in a conventional display apparatuses including the image display apparatus described in Japanese Laid-Open Patent Publication No. 2005-221634, an orientation of an image received by the display apparatus is unclear and it is impossible to perform judgment such as whether to rotate the image and whether to add black band parts on a display apparatus side. Accordingly, a mechanism with the HDMI specification or the MHL specification expanded is desired for such judgment.

Further, black band parts are sometimes added to an output image from the mobile terminal apparatus, and even when display with the black band parts removed as unnecessary parts is desired in the display apparatus, there is no information showing whether to be the output image with the black band parts added or the output image without addition on the display apparatus side, thus making it also impossible to remove them automatically.

Furthermore, when an output image including black band parts, which is output from the mobile terminal apparatus, is displayed on the display apparatus, there is no information showing which orientation an actual image of an output source (that is, an image in which the black band parts are removed from the output image) has on the display apparatus side. Thus, it comes into a state where a user has to change a seeing position (for example, the user is positioned horizontally to the display apparatus) to visually identify the actual image, so that it becomes necessary to operate the display apparatus for rotation, or a state where an entire display screen of the display apparatus is not able to be used to a maximum extent for displaying largely.

Furthermore, when the display apparatus is an apparatus with a touch sensor, such a using case is considered that not only an image is received from the mobile terminal apparatus serving as a source device, but touch information received at the display apparatus is returned to the mobile terminal apparatus to control so that the mobile terminal apparatus is operated with the touch operation at the display apparatus. In this using case, if processing such as rotation and addition of black band parts is executed for an output image from the mobile terminal apparatus freely on the display apparatus side, a touch coordinate detected by the display apparatus is deviated from that of an output video of the mobile terminal apparatus, thus making it impossible to perform an operation correctly even if the touch information is returned to the mobile terminal apparatus as it is.

The above-described points can be caused in the same manner also when an image is output from a source device in which a size and an aspect ratio of an output image are fixed and the output image is displayed on the display apparatus without limitation to the HDMI specification or the MHL specification.

SUMMARY OF THE INVENTION

An object of the present invention is that, in the case of displaying a transmission image that is transmitted from a source device on a display apparatus, even when black band parts are included in the transmission image, an actual image excluding the black band parts is displayed so as to fit to an orientation of a display screen of the display apparatus and with a size using the entire display screen to a maximum extent.

An object of the present invention is to provide a display apparatus that includes a display portion, an orientation detecting portion for detecting an orientation of an upper part or a lower part of a display screen of the display portion, a receiving portion for receiving an image signal transmitted from a source device, and an image processing portion, and displays an image processed by the image processing portion on the display portion, wherein the receiving portion receives, together with the image signal, state information showing an orientation of an upper part or a lower part of a transmission image indicated by the image signal and presence/absence of black band parts in the transmission image, and the image processing portion applies, to the transmission image, any one or more processings among rotation processing for rotation such that the orientation of the upper part or the lower part of the display screen coincides with the orientation of the upper part or the lower part of the transmission image received at the receiving portion, scaling processing for performing scaling so as to perform display on the display screen to a maximum extent with an aspect ratio maintained, and black-band processing for adding or removing black band parts, according to a detection result of the orientation detecting portion and the state information received at the receiving portion.

Another object of the present invention is to provide the display apparatus, wherein a touch sensor that outputs touch information showing a touched position by a user operation is included in the display portion, and when the touch information is output from the touch sensor, depending on whether or not each of the rotation processing, the scaling processing and the black-band processing has been executed for a display image displayed on the display portion, the display apparatus performs coordinate conversion so that a coordinate of the touch information coincides with that of the transmission image, and notifies the source device of the touch information after the coordinate conversion.

Another object of the present invention is to provide the display apparatus, wherein before receiving the image signal at the receiving portion, the display apparatus notifies the source device of execution-allowed information showing that the display apparatus is able to execute each of the rotation processing, the scaling processing and the black-band processing, or execution-allowed information showing that the display apparatus is able to execute each of the rotation processing and the black-band processing.

Another object of the present invention is to provide a source device that transmits an image signal to the display apparatus as defined in claim 1, for transmitting, together with the image signal, state information showing an orientation of an upper part or a lower part of a transmission image indicated by the image signal and presence/absence of black band parts in the transmission image.

Another object of the present invention is to provide a display system including the display apparatus and the source device.

BRIEF DESCRIPTION OF THE DRAWINGS

FIG. 1 is a block diagram showing an exemplary configuration of a display system according to the present invention;

FIG. 4 is a flowchart explaining exemplary processing of the display apparatus in the display system of FIG. 1;

FIG. 5A is a diagram explaining an example of image conversion processing in the processing of FIG. 4;

FIG. 7 is a flowchart explaining another exemplary processing of the display apparatus in the display system of FIG. 1;

FIG. 8A is a diagram explaining an example of negotiation processing between devices applicable in the display system of FIG. 1; and FIG. 8B is a diagram subsequent to FIG. 8A.

PREFERRED EMBODIMENTS OF THE INVENTION

Figure 2A:
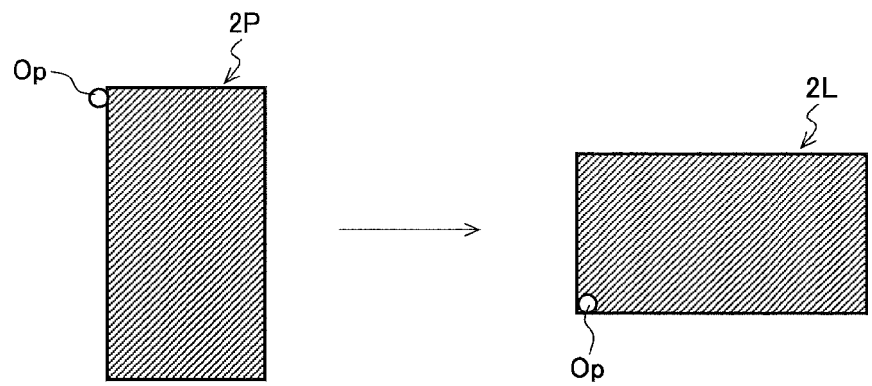
FIG. 2A is a diagram showing an example of a transmission image that is transmitted from a source device side in the display system of FIG. 1.

A display system according to the present invention is provided with a display apparatus and a source device that outputs an image to the display apparatus. Description will be given below for the display system according to the present invention as well as the display apparatus and the source device according to the present invention, by taking an example that the display apparatus and the source device are basically connected with a wired MHL cable.

However, the same is also applied, for example, in the case of connection with an HDMI cable, in the case of wireless connection with an HDMI adapter compatible with Miracast, and the like, instead of the MHL cable. Further, the present invention is for solving a problem that can be caused when an image is output from a source device in which a size and an aspect ratio of an output image are fixed and the output image is displayed on a display apparatus without limitation to an HDMI specification or an MHL specification, and the specification that is adopted for the connection of the display apparatus and the source device is also not limited to the MHL specification nor the HDMI specification. Of course, the display apparatus according to the present invention is able to appropriately display even an image that is output from a source device in which a size and an aspect ratio of an output image are not fixed in the same manner based on information from the source device as described below. Moreover, as the specification that is adopted for the connection of the display apparatus and the source device, for example, a WiFi (registered trademark) specification is also able to be adopted.

(First Embodiment)

FIG. 1 is a block diagram showing an exemplary configuration of the display system according to the present invention.

In the display system exemplified in FIG. 1, a display apparatus 1 that functions as a sink device and a source device 2 are connected with an MHL cable 3, and an image (hereinafter, video) is able to be transmitted from the source device 2 to the display apparatus 1 via the MHL cable 3.

The display apparatus 1 is provided with a display portion that displays an image, a receiving portion that receives an image signal (video signal) transmitted (transferred) from the source device 2 and an image processing portion, and display an image processed by the image processing portion on the display portion. Note that, such display control may be performed, for example, by a control portion of the display apparatus 1.

Further, the image processing portion applies image processing such as rotation processing, scaling processing and black-band processing for a transmission image indicated by the image signal received at the receiving portion. Note that, the transmission image is an output image, and is also able to be referred to as a received image or an input image when viewed from the display apparatus 1 side.

Here, the rotation processing is processing for rotation such that an orientation of an upper part or a lower part of a display screen detected by an orientation detecting portion 19 described below coincides with an orientation of an upper part or a lower part of the transmission image received at the receiving portion. The scaling processing is processing for performing scaling for performing display to a maximum extent on the display screen with an aspect ratio maintained. The black-band processing is processing for adding or removing black band parts.

The display apparatus 1 exemplified in FIG. 1 is provided with a video display portion 11 that displays a video, as an example of the display portion, and is provided with a Transition Minimized Differential Signaling (TMDS: registered trademark, the same hereinafter) signal processing portion 15, an MHL I/F 16, and a CBUS (Control Bus) signal processing portion 17, as an example of the receiving portion.

The video display portion 11 is a display panel such as a liquid crystal display or an organic electro luminescence display. The MHL I/F 16 is a connection interface of the MHL, and receives a TMDS signal transmitted from the source device 2 to provide to the TMDS signal processing portion 15. The TMDS signal processing portion 15 converts the TMDS signal input from the MHL I/F 16 into a video signal. The CBUS signal processing portion 17 exchanges a CBUS signal (control signal) with the connected source device 2 via the MHL I/F 16.

Further, the display apparatus 1 exemplified in FIG. 1 is provided with a video conversion processing portion 14 that executes video processing, as an example of the image processing portion. The video conversion processing portion 14 is configured so as to be allowed to execute rotation processing of a video, scaling processing of a video, and processing for adding/removing black band parts to/from a video, as the video processing.

Note that, the video conversion processing portion 14 is configured so as to be allowed to be capable of these processing not only for a video received at the receiving portion, but also for images of files of a picture, a moving image and a document etc., an image of a UI (User Interface) and the like which are stored in an internal storage device. The image stored in the internal storage device is also able to be displayed on the video display portion 11 after the processing at the video conversion processing portion 14.

Further, the display apparatus 1 exemplified in FIG. 1 is provided with a main control portion 10 as an example of the control portion. Note that, description will be given based on that it is configured so that a video output from the video conversion processing portion 14 is displayed on the video display portion 11, and the main control portion 10 controls the display on the video display portion 11 indirectly by controlling the video conversion processing portion 14.

The main control portion 10 operates programs stored in a program saving area to perform various control. For example, the main control portion 10 is composed of a control device such as a CPU (Central Processing Unit) or an MPU (Micro Processing Unit), a RAM (Random Access Memory) as a working area, and a storage device, and a part or all of them is able to be mounted as an integrated circuit/IC chip set.

In this storage device, including a control program (which includes a program executing processing according to the present invention), the UI image described above, various setting contents, files of a picture, a moving image and a document etc., and the like are stored. As this storage device, a flash ROM (Read Only Memory), an EEPROM (Electrically Erasable and Programmable ROM) and the like are cited, and a screen orientation storage portion 18 described below is also able to be configured as a part of this storage device. A Hard Disk Drive (HDD) is also able to be adopted as this storage device, depending on a type of the display apparatus 1.

Moreover, the display apparatus 1 exemplified in FIG. 1 is further provided with a touch input portion 12a, a touch conversion processing portion 12b, a key input portion 13a, a UI processing portion 13b, the screen orientation storage portion 18 and the orientation detecting portion 19.

The key input portion 13a has a hardware key and detects input of an operation form the key. Examples of this hardware key include a power key and a volume adjustment key. The UI processing portion 13b displays an OSD (On Screen Display) by input of the key operation and performs various setting for the display apparatus 1.

The touch input portion 12a is composed of a touch sensor that detects touch input by a user, and is provided on a top of the video display portion 11 or embedded in the video display portion 11. Moreover, a touch panel is formed by the touch sensor and the video display portion 11. The touch conversion processing portion 12b performs coordinate conversion for touch information input at the touch input portion 12a.

Images of files of a picture, a moving image, and a document etc., the UI image and the like are displayed on the video display portion 11, and the user is to touch a predetermined position on the display screen while seeing the display contents. The touch input portion 12a detects the touch and outputs the detection result directly to the main control portion 10 (or to the touch conversion processing portion 12b so as not to apply any processing at the touch conversion processing portion 12b) as the touch information. When an image such as the UI image of the inside of the display apparatus 1 is displayed on the video display portion 11, processing concerning the image such as the UI image corresponding to the touched position detected by the touch input portion 12a is executed. Further, in the case of the UI image, the UI image is shifted as necessary by the detection of the touch.

On the other hand, the present invention has a feature in that a transmission image that is transmitted from the source device 2 is displayed on the display screen of the display apparatus 1, and in a situation where the transmission image is displayed on the video display portion 11, a user operation for the source device 2 by the touch sensor is able to be received. Though this point will be described below as a second embodiment, before that, brief description will be given. In such a situation, the touch input portion 12a outputs touch information to the touch conversion processing portion 12b and the touch conversion processing portion 12b performs conversion of the touch information, as well as the CBUS signal processing portion 17 converts the touch information output from the touch conversion processing portion 12b and vertical and horizontal arrangement information of the display apparatus 1 into CBUS signals to transmit to the source device 2 side via the MHL I/F 16.

Note that, though an example of the display apparatus provided with the touch sensor (so-called touch monitor) is taken for description in the second embodiment described below and for improving operability of the user, the display apparatus 1 may be provided with only a key input portion 13a having a hardware key and may not be provided with the touch sensor, as an operation portion that receives a user operation.

The orientation detecting portion 19 detects an orientation of the display screen (rotational state of its own). This orientation (sense) is changed when the user holds the display apparatus 1 for rotational operation or when user setting for rotating an image on the display screen is received. The orientation of the display screen only requires to detect either an orientation of an upper part or an orientation of a lower part of the display screen. Moreover, the orientation detecting portion 19 is also able to be referred to as an attitude recognizing portion that recognizes a current attitude (degree of inclination) of the display apparatus 1 and outputs attitude information showing the current attitude.

First, description will be given for a case where the orientation detecting portion 19 detects a change in an orientation that is caused when the user holds the display apparatus 1 for rotational operation. In such a case, a sensor that detects an orientation of the display screen may be provided as the orientation detecting portion 19.

Here, the sensor may detect not the orientation but a direction of the display screen, that is, as a vertical direction (direction of a segment connecting a position on the upper side and a position on the lower side of the display apparatus 1 when the user holds the display apparatus 1 to see the display screen of the display apparatus 1). In this manner, the sensor is also able to adopt such a configuration as to detect a direction in which the user holds the display apparatus 1, such as directions of whether to face front toward the user, and whether to rotate 90 degrees. This is because the display apparatus 1 is sometimes configured so as not to rotate an image more than the first rotational operation, for example, even when the rotational operation is performed to the right 90 degrees to rotate the image to the left 90 degrees, followed by performing rotation again to the right 90 degrees. However, it is preferable that a position on the lower side or a position on the upper side is set as a start point and the other is set as an end point (that is, to detect an orientation of the upper part and an orientation of the lower part of the display screen).

The sensor provided as the orientation detecting portion 19 may use an existing technology, and examples thereof include a triaxial acceleration sensor, a nine-axis motion sensor having a triaxial acceleration sensor, a triaxial angular velocity sensor and a triaxial geomagnetic sensor, and a motion sensor having a triaxial acceleration sensor and a triaxial (or biaxial) geomagnetic sensor.

When the apparatus is stood on a stand, when the apparatus is placed by extracting a claw or the like that is provided so as to be insertable/extractable in order to be placed on a horizontal face at a slight angle with respect to the horizontal face, when the user holds the apparatus with his/her hand at an angle with respect to the horizontal face, or the like, the orientation detecting portion 19 may detect the orientation of the upper part or the lower part (or vertical direction) of the display screen with the sensor automatically.

Description will be given for a case where the orientation detecting portion 19 detects a change in an orientation caused by receiving user setting for rotating an image on the display screen. In this case, the display apparatus 1 is configured so as to enable rotation processing also by a user operation, and may cause the screen orientation storage portion 18 to store an orientation of an upper part or a lower part of the display screen as a result caused by the rotation processing by a user operation (user setting for rotation) and the orientation detecting portion 19 may read it to execute detection.

Moreover, the main control portion 10 has an image rotation portion that performs rotational control for rotating an image that is being displayed on the display screen according to a change in the detection result of the sensor by rotational operation of the display apparatus 1 by the user, or a change by receiving user setting for rotating the image on the display screen.

The rotational control according to the change by the sensor may be performed so as to rotate the image that is being displayed, for example, in the case of rotation by a predetermined angle or more on an almost horizontal face to the display screen. Note that, at a time of the rotational control, a rotational amount of the display image may be determined, for example, according to a change amount in the detection result so that the image is rotated gradually like an animation. In addition, by setting such that the sensor detects whether or not to rotate by a constant amount or more (or executes rotational control), for example, only when the display face of the display apparatus 1 is inclined by a predetermined angle (for example, about 5° to 45°) or more from the horizontal face, the rotational control is not executed no matter how the display apparatus 1 in a state of being placed on a horizontal place such as a table is rotated.

The screen orientation storage portion (screen orientation holding portion) 18 is a storage portion that holds the detection result of the sensor and user setting as described above, and is able to be composed of an EEPROM, a flash ROM or the like in the same manner as the storage device in the main control portion 10. The screen orientation storage portion 18 holds information of a current orientation of installation of the display apparatus 1 that is a detection result of the orientation detecting portion 19 (or that is determined by a user operation), whether a video source is portrait/landscape, and whether it has black bands.

Next, the source device 2 will be described. Here, though description will be given premising that the source device according to the present invention is a mobile terminal apparatus such as a smartphone, a mobile PC or a tablet terminal, it is set that a display portion that displays an image is also provided in the source device 2 and rotation processing for rotating the image and processing for adding black band parts to the image are basically possible. Though the mobile terminal apparatus is taken as the source device 2 because such an apparatus including rotation processing is a mobile apparatus in many cases, there is also an apparatus, even in an installation type, that is able to rotate a display panel with respect to an installation table, so that it can be said that the source device 2 according to the present invention is also applicable to the apparatus in the installation type.

Moreover, the source device 2 is provided with an image processing portion and a transmitting portion that transmits (transfers) an image signal (video signal) to the display apparatus 1, and causes the display portion to display an image after processing at this image processing portion. Note that, such display control may be performed, for example, by a control portion of the source device 2.

The image processing portion on the source device 2 side applies image processing such as rotation processing, scaling processing and black-band processing for images such as images of files of a picture, a moving image and a document etc., and a UI image, that are stored in a storage device inside the source device 2.

Here, the rotation processing is processing for rotation such that an orientation of an upper part or a lower part of a display screen detected by an orientation detecting portion 29 described below coincides with an orientation of an upper part or a lower part of the image stored in the internal storage device. At a time of displaying an image, depending on an application program for displaying the image, there is also one in which a display direction is fixed to vertical display or horizontal display. The scaling processing is processing for performing scaling for performing display to a maximum extent on the display screen with an aspect ratio maintained. The black-band processing is processing for adding or removing black band parts.

The source device 2 exemplified in FIG. 1 is provided with a video display portion 21 that displays a video, as an example of the display portion, and is provided with a TMDS signal processing portion 25, an MHL I/F 26, and a CBUS signal processing portion 27, as an example of the transmitting portion, and is provided with a video conversion processing portion 24, as an example of the image processing portion.

Further, the source device 2 exemplified in FIG. 1 is provided with a main control portion 20 as an example of the control portion. Note that, description will be given based on that it is configured so that a video output from the video conversion processing portion 24 is displayed on the video display portion 21, and the main control portion 20 controls the display on the video display portion 21 indirectly by controlling the video conversion processing portion 24.

The video display portion 21 is a display panel such as a liquid crystal display or an organic electro luminescence display. The video conversion processing portion 24 is configured so as to be allowed to execute rotation processing of a video, scaling processing of a video, and processing for adding/removing black band parts to/from a video, as the video processing.

The TMDS signal processing portion 25 converts a video signal to be transmitted to the display apparatus 1 into a TMDS signal. The MHL I/F 26 is an MHL connection interface, and transmits the TMDS signal that is converted in this manner to the display apparatus 1 through the MHL cable 3. The CBUS signal processing portion 27 exchanges a CBUS signal (control signal) with the connected display apparatus 1 via the MHL I/F 26.

The main control portion 20 operates programs stored in a program saving area to perform various control. For example, the main control portion 20 is composed of a control device such as a CPU or an MPU, a RAM (Random Access Memory) as a working area, and a storage device, and a part or all of them is able to be mounted as an integrated circuit/IC chip set.

In this storage device, including a control program (which includes the application program and the program executing processing according to the present invention), the UI image described above, various setting contents, files of a picture, a moving image and a document etc., and the like are stored. As this storage device, a flash ROM, an EEPROM and the like are cited, and a screen orientation storage portion 28 described below is also able to be configured as a part of this storage device. A HDD is also able to be adopted as this storage device, depending on a type of the source device 2.

Furthermore, the source device 2 exemplified in FIG. 1 has the same configuration to some extent with each portion of the display apparatus 1. That is, the source device 2 of FIG. 1 is provided with a main control portion 20 that is an example of the control portion of the source device 2, a touch input portion 22, a key input portion 23a, a UI processing portion 23b, a screen orientation storage portion 28, and the orientation detecting portion 29.

The key input portion 23a has a hardware key and detects input of an operation form the key in the same manner as the key input portion 13a. The UI processing portion 23b displays an OSD by input of the key operation in the same manner as the UI processing portion 13b and performs various setting for the source device 2.

The touch input portion 22 is composed of a touch sensor that detects touch input by a user, and is provided on a top of the video display portion 21 or embedded in the video display portion 21, in the same manner as the touch input portion 12a. The touch input portion 22 outputs touch information to the main control portion 20 at all times, differently from the touch input portion 12a. The source device 2 does not need a part corresponding to the touch conversion processing portion 12b of the display apparatus 1. Images of files of a picture, a moving image, and a document etc., the UI image and the like are displayed on the video display portion 21, and the user is to touch a predetermined position on the display screen while seeing the display contents. The touch input portion 22 may detect the touch and output the detection result to the main control portion 20 as touch information. When an image such as the UI image of the inside of the source device 2 is displayed on the video display portion 21, processing concerning the image such as the UI image corresponding to the touched position detected by the touch input portion 22 is executed. Further, in the case of the UI image, the UI image is shifted as necessary by the detection of the touch.

Note that, though an example of the source device 2 provided with the touch sensor is taken for description in the second embodiment described below and for improving operability of the user, the source device 2 may be provided with only a key input portion 23a having a hardware key and may not be provided with the touch sensor, as an operation portion that receives a user operation.

The orientation detecting portion 29 detects an orientation of the display screen (rotational state of its own) in the same manner as the orientation detecting portion 19. However, of course, the display screen to be detected is a display screen of the display portion (exemplified with the video display portion 21) of the source device 2. Other points are basically the same as the orientation detecting portion 19, and description thereof will be omitted.

Moreover, the main control portion 20 has an image rotation portion that performs rotational control for rotating an image that is being displayed on the display screen according to a change in the detection result of the sensor by rotational operation of the source device 2 by the user in the same manner as the image rotation portion of the main control portion 10, or a change by receiving user setting for rotating the image on the display screen.

The screen orientation storage portion 28 is a storage portion same as the screen orientation storage portion 18, and holds information of a current orientation of installation of the source device 2 that is a detection result of the orientation detecting portion 29 (or that is determined by a user operation), whether a video source is portrait/landscape, and whether or not it has black bands. Moreover, the screen orientation storage portion 28 is able to be composed of an EEPROM, a flash ROM or the like in the same manner as the storage device in the main control portion 20.

Next, main features of the present invention will be described. As one of the main features of the present invention, the receiving portion of the display apparatus 1 receives, with an image signal, state information showing an orientation of an upper part or a lower part of a transmission image indicated by the image signal (whether or not the transmission image has been rotated) and presence/absence of black band parts in the transmission image (presence/absence of addition of black band parts, that is, whether or not black band parts are inserted in the transmission image).

In other words, the source device 2 that transmits the image signal to the display apparatus 1 transmits, with the image signal, state information showing the orientation of the upper part or the lower part of the transmission image indicated by the image signal and presence/absence of black band parts in the transmission image.

Further, as one of the main features of the present invention, the image processing portion of the display apparatus 1, which is exemplified with the video conversion processing portion 14, applies any one or more processings of rotation processing, scaling processing and black-band processing to the transmission image according to the detection result at the orientation detection portion 19 and the state information received at the receiving portion. The video conversion processing portion 14 may apply any one or more processings of rotation processing, scaling processing and black-band processing upon notification of the detection result and the state information from the main control portion 10 or in accordance with determination of execution processing at the main control portion 10.

Depending on the detection result and the state information, it sometimes happens that all processing of the three processing is executed or all processing are unnecessary in the video conversion processing portion 14. When the display screen of the source device 2 is tried to be displayed on the display screen of the display apparatus 1, however, it cannot be said as being useful that the former and the latter have the same size, and the former is typically smaller than the latter, so that at least scaling processing is to be executed basically in such a case.

An orientation of the display screen of the display apparatus 1 (direction in which the display apparatus 1 is arranged) is held in the screen orientation storage portion 18 as described above. Moreover, information of whether a transmission image that is transmitted from the source device 2 serving as a video source is portrait/landscape and whether or not it has black bands is notified from the source device 2 through the MHL I/F 16 and the CBUS signal processing portion 17 at a first timing when the transmission image is transferred or a timing when the transmission image is switched, and this information is also held in the screen orientation storage portion 18. Using these information held in the screen orientation storage portion 18, the video conversion processing portion 14 executes rotation processing, scaling processing and black-band processing as necessary for the transmission image.

Figure 2B:
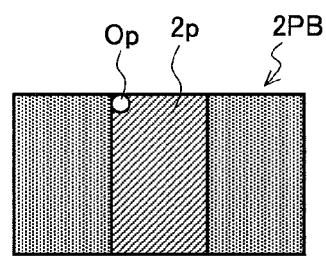
FIG. 2B is a diagram showing another example of a transmission image that is transmitted from the source device side in the display system of FIG. 1.
Figure 2C:
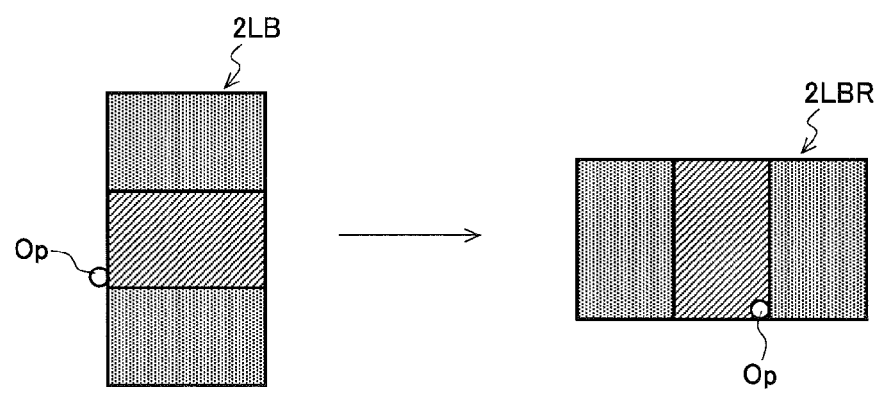
FIG. 2C is a diagram showing another example of a transmission image that is transmitted from the source device side in the display system of FIG. 1.
Figure 3A:
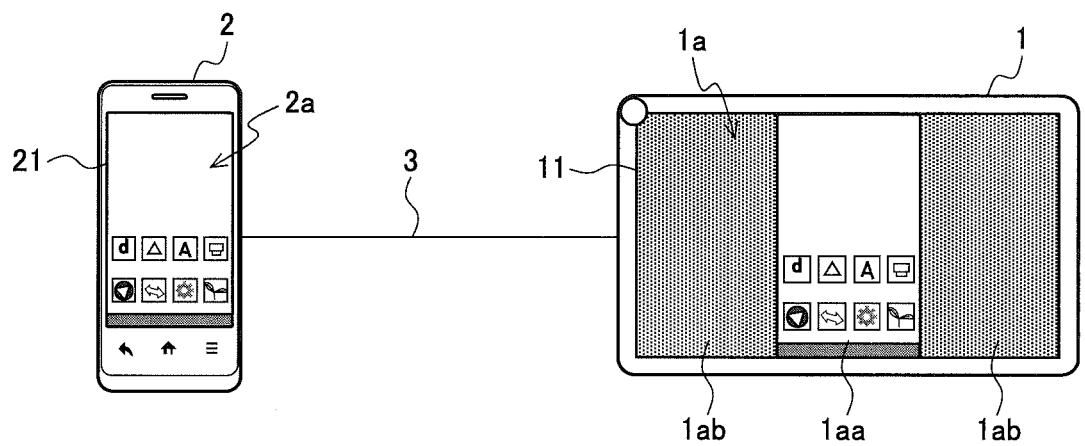
FIG. 3A is a diagram showing an example of a display screen on the source device side and a display screen on a display apparatus side corresponding thereto in the display system of FIG. 1.

Next, description will be given for such control with reference to FIG. 2A to FIG. 2C and FIG. 3A to FIG. 3H. FIG. 2A is a diagram showing an example of a transmission image (output image) that is transmitted (output) from the source device 2 side, and both FIG. 2B and FIG. 2C are diagrams showing another example different from FIG. 2A. Further, FIG. 3A is a diagram showing an example of a display screen on the source device 2 side and a display screen on the display apparatus 1 side corresponding thereto, and all of FIG. 3B to FIG. 3H are diagrams showing another example different from FIG. 3A.

FIG. 2A to FIG. 2C and FIG. 3A to FIG. 3H take such an example that the source device 2 serving as a video source is a smartphone and the display apparatus 1 that displays the video is a tablet-type monitor.

Moreover, for simplicity of description, a flow of processing will be described by taking a case where the display apparatus 1 is in a state of portrait arrangement in which an image is rotated 90 degrees to the right from a landscape state (that is, a state where the display apparatus 1 itself is rotated 90 degrees to the left) as an example. As to rotation in the source device 2, the same case is taken as an example. Further, in FIG. 2A to FIG. 2C, Op is an origin of an actual image (image to which no black band part is added), indicating an upper left end in the case of a vertical image and indicating a lower left end in the case of a horizontal image. Note that, to the contrary, also a case where the display apparatus 1 and/or the source device 2 has portrait arrangement in which an image is rotated 90 degrees to the left from a landscape state will be able to be described with the same concept so that the description thereof will be omitted.

First, when the source device 2 outputs a video on the display screen thereof to the external display apparatus 1, a landscape-placed screen is output as it is as exemplified with an image 2L of FIG. 2A. However, the source device 2 does not output a portrait-placed screen as it is as exemplified with an image 2P of FIG. 2A, and when its direction is not prescribed by an application at a time of display, outputs it as a landscape-placed screen (image 2L). Note that, in this situation, there is also a case where data is held as the image 2L inside the source device 2, which is rotated to be displayed as the image 2P on the video display portion 21. On the other hand, when the portrait-placed screen is prescribed to be portrait-placed by the application, black band parts are added to right and left ends of an actual image $2p$ and an image 2PB as exemplified in FIG. 2B is generated and output.

Moreover, in the case of a portrait-placed screen and case of being prescribed to be landscape-placed by an application at a time of display, an image like an image 2LB exemplified in FIG. 2C that black band parts are added to upper and lower ends of an actual image is to be displayed on the video display portion 21 in the source device 2. In this case as well, the source device 2 is to perform output as a horizontal image like an image 2LBR exemplified in FIG. 2C.

In the display apparatus 1 according to the present invention, the display screen is rotatable vertically and horizontally in the same manner as the source device 2 as described above, and according to information showing its own rotation and the above-described state information of an output video from the source device 2, the video conversion processing portion 14 performs video processing at the display apparatus 1 side to constitute an optimal screen.

The optimal screen configuration indicates a screen configuration with the basically same state as a viewing state of a user in the source device 2 (state where the orientation which the user sees is the same). That is, it is desired in the display apparatus 1 in which an image on a display screen is rotatable to constitute a screen as exemplified in FIG. 3A to FIG. 3H depending on orientations of the display screen of the source device 2 and installation of the display apparatus 1.

As described above, output with 720p is widely used in the MHL specification (or HDMI specification) whether to be portrait-placed or landscape-placed. Further, the source device 2 is to constitute a screen by fixing landscape-placed installation in a state of being connected with the MHL cable 3. Thus, when an application having only a vertical screen is used, black band parts (black screen) are put in right and left ends of an image, followed by scaling to 720P and display.

In this manner, since a transmission image from the source device 2 is always a landscape-placed image, it is only the cases of FIG. 3A, FIG. 3C, FIG. 3E and FIG. 3G that the source device 2 including a conventional source device deals with as image output, that is, that an actual image is able to be displayed with a correct orientation of a transmission image as it is even when the screen of the display apparatus 1 is landscape-placed. Note that, though description will not be given particularly, scaling processing is required as described above, and black-band processing is also required in some cases depending on a difference of sizes of display screens.

In the case of FIG. 3A, an image that black band parts like the image 2PB of FIG. 2B are added to a display image 2a is transmitted from the source device 2, and a display image 1a in the display apparatus 1 that is landscape-placed is composed of an actual image 1aa corresponding to the display image 2a and black band parts 1ab added to right and left ends thereof.

Figure 3B:
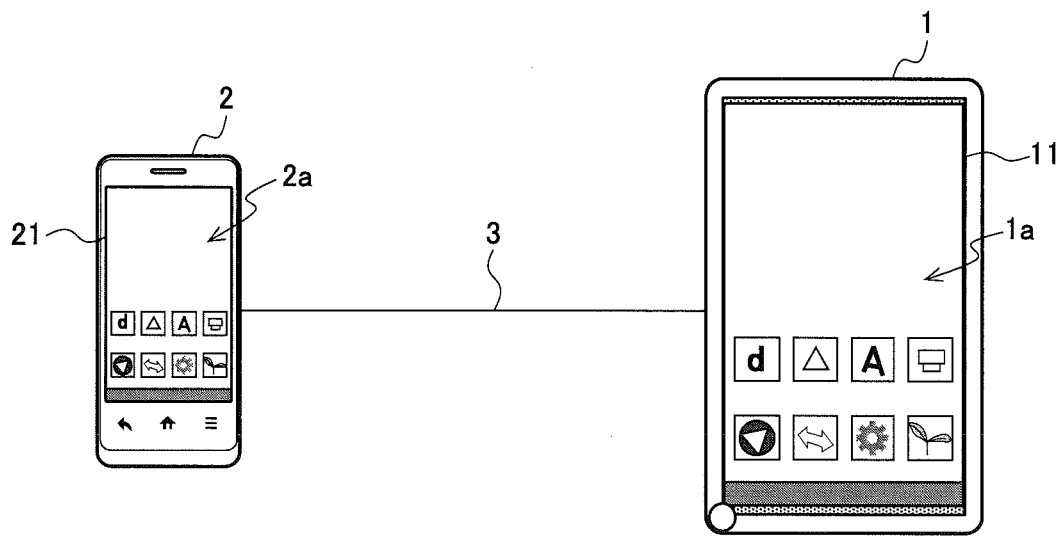
FIG. 3B is a diagram showing another example of the display screen on the source device side and the display screen on the display apparatus side corresponding thereto in the display system of FIG. 1.

As exemplified in FIG. 3B, when the video display portion 11 side of the display apparatus 1 is portrait-placed (portrait display screen), image transmission is carried out from the source device 2 after the display image 2a is subjected to image rotation so as to be a landscape-placed actual image like the image 2L of FIG. 2A. Then, the display image 1a in the display apparatus 1 becomes an image that the received display image 2a is rotated 90 degrees to the right, which becomes a portrait image as being displayed on the portrait display screen in the video display portion 21 of the source device 2.

Figure 3C:
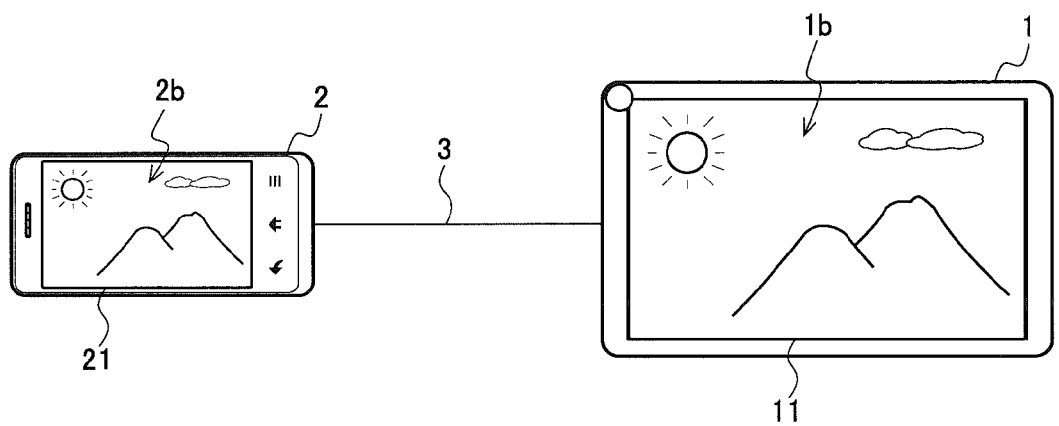
FIG. 3C is a diagram showing another example of the display screen on the source device side and the display screen on the display apparatus side corresponding thereto in the display system of FIG. 1.

In the case of FIG. 3C, an actual image like the image 2L of FIG. 2A is transmitted as it is to the display image 2b from the source device 2, and a display image 1b in the display apparatus 1 that is landscape-placed is composed only of an actual image corresponding to the display image 2b.

Figure 3D:
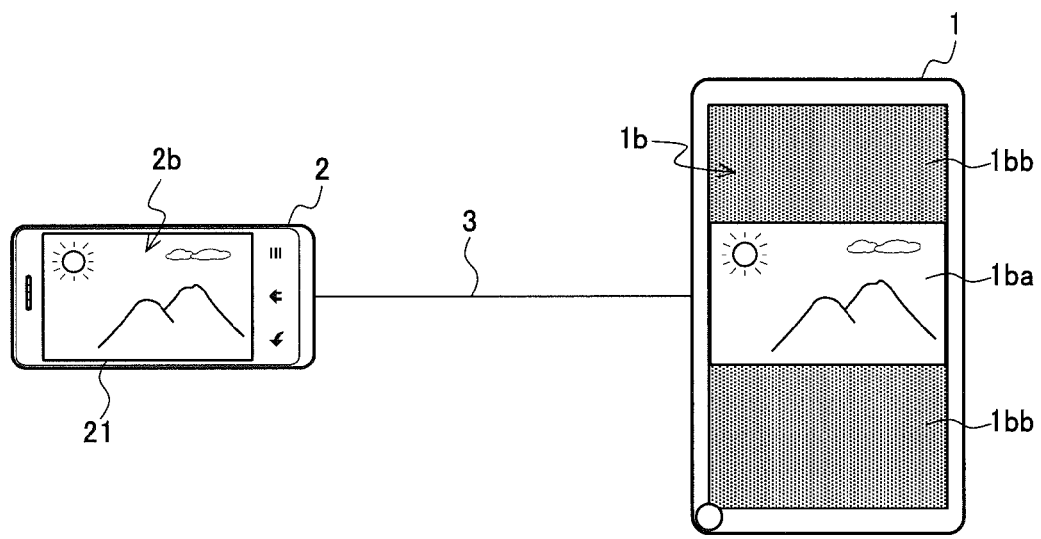
FIG. 3D is a diagram showing another example of the display screen on the source device side and the display screen on the display apparatus side corresponding thereto in the display system of FIG. 1.

On the other hand, in the case of FIG. 3D, due to restriction of hardware of the source device 2, there is a case where it is difficult to perform output after performing such conversion for the display image 2b to be the display image 1b in the display apparatus 1. Cited is a case where a moving image playing application and the like that processes a video by hardware and does not support rotation of a screen, and the like. In fact, an application that displays a moving image is configured to execute decoding of a moving image by a decoder with a hardware configuration in many cases, and such a configuration does not correspond to processing for reducing and displaying an input video nor processing for displaying after rotation.

Accordingly, in the case of FIG. 3D, the display image 2b is output to the display apparatus 1 as it is, and the video conversion processing portion 14 of the display apparatus 1 may execute conversion that the display image 1b results in being added with the black band parts 1bb at upper and lower ends of an actual image 1ba corresponding to the display image 2b on the display apparatus 1 side.

Figure 3E:
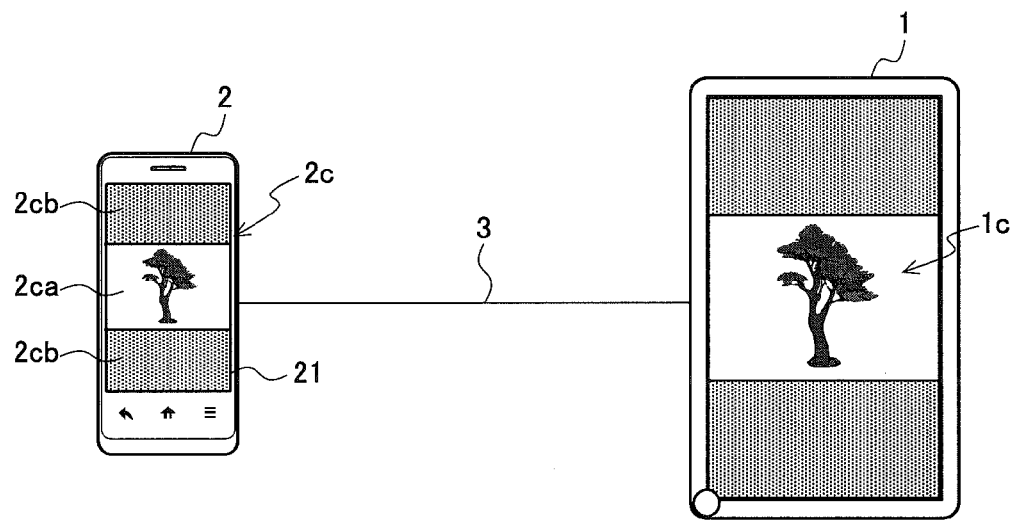
FIG. 3E is a diagram showing another example of the display screen on the source device side and the display screen on the display apparatus side corresponding thereto in the display system of FIG. 1.

In the case of FIG. 3E, the source device 2 has a state where a display image 2c itself has black band parts 2cb added at upper and lower ends of the actual image 2ca and image transmission is carried out after the display image 2c like this is subjected to image rotation so as to be a landscape-placed image like the image 2LBR of FIG. 2C. Then, in the display apparatus 1 that is portrait-placed like in the case of FIG. 3E, the display image 1c is an image that the display image 2c has black band parts remained, which is a portrait image as being displayed on the portrait display screen in the video display portion 21 of the source device 2.

Figure 3F:
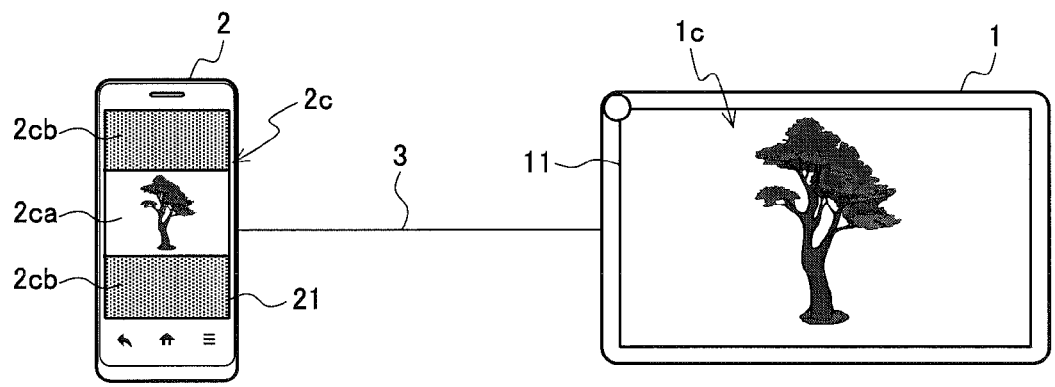
FIG. 3F is a diagram showing another example of the display screen on the source device side and the display screen on the display apparatus side corresponding thereto in the display system of FIG. 1.

As exemplified in FIG. 3F, when the video display portion side of the display apparatus 1 is landscape-placed (landscape display screen), image transmission is carried out from the source device 2 after the display image 2c is subjected to image rotation so as to be a landscape-placed image like the image 2LBR of FIG. 2C, in the same manner as the case of FIG. 3E. Then, in the display apparatus 1 that is landscape-placed like FIG. 3F, the display image 1c is an image that the black band parts 2cb are removed from the received display image 2c, which is a landscape image that only an actual image 2ca on the video display portion 21 of the source device 2 remains displayed. Thus, such black-band removing processing may be executed by the video conversion processing portion 14 of the display apparatus 1.

Figure 3G:
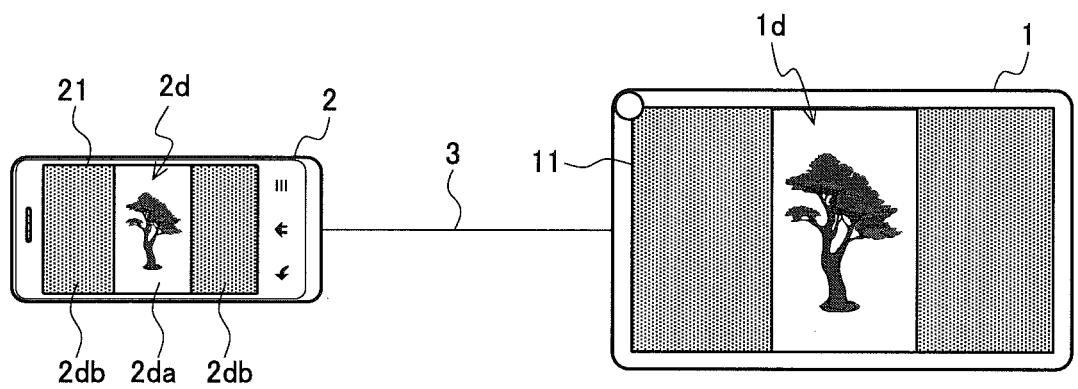
FIG. 3G is a diagram showing another example of the display screen on the source device side and the display screen on the display apparatus side corresponding thereto in the display system of FIG. 1.

In the case of FIG. 3G, the source device 2 has a state where a display image 2d itself has black band parts 2db added at right and left ends of an image 2da, and image transmission is carried out with the display image 2d like this remained landscape-placed like the image 2LBR of FIG. 2C. Then, in the display apparatus 1 that is landscape-placed like FIG. 3G, the display image 1d is an image that the display image 2c has black band parts remained, which is a landscape image as being displayed on the landscape display screen in the video display portion 21 of the source device 2.

Figure 3H:
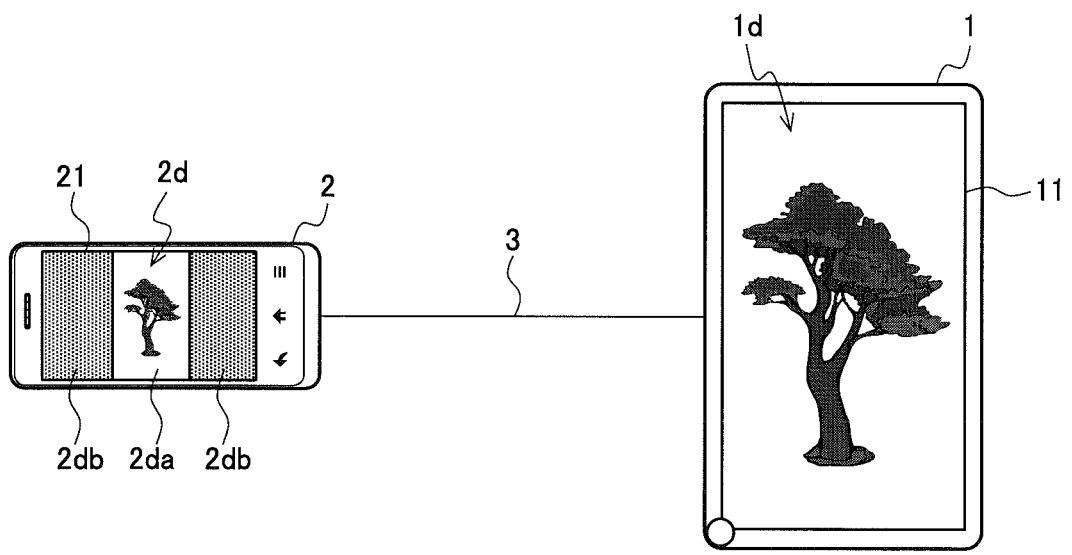
FIG. 3H is a diagram showing another example of the display screen on the source device side and the display screen on the display apparatus side corresponding thereto in the display system of FIG. 1.

As exemplified in FIG. 3H, when the video display portion 11 side of the display apparatus 1 is portrait-placed (portrait display screen), in the same manner as the case of FIG. 3G, the display image 2d itself has a state of having the black band parts 2db added at right and left ends of the image 2da, and image transmission is carried out with the display image 2d like this remained landscape-placed like the image 2LBR of FIG. 2C. Then, in the display apparatus 1 that is portrait-placed like FIG. 3H, the display image 1d is an image with the black band parts 2db removed from the received display image 2*d*, which is a portrait image that only the actual image 2*da* on the video display portion 21 of the source device 2 remains displayed. Thus, such black-band removing processing may be executed by the video conversion processing portion 14 of the display apparatus 1.

In order to enable corresponding to any cases like these, the source device 2 transmits, with an image signal, state information (information showing an orientation of an upper part or a lower part of a transmission image indicated by the image signal and presence/absence of black band parts in the transmission image), and the display apparatus 1 receives the state information and applies any one or more processings of rotation processing, scaling processing and black-band processing according to the state information and the detection result at the orientation detecting portion 19 in the display apparatus 1.

Figure 5B:
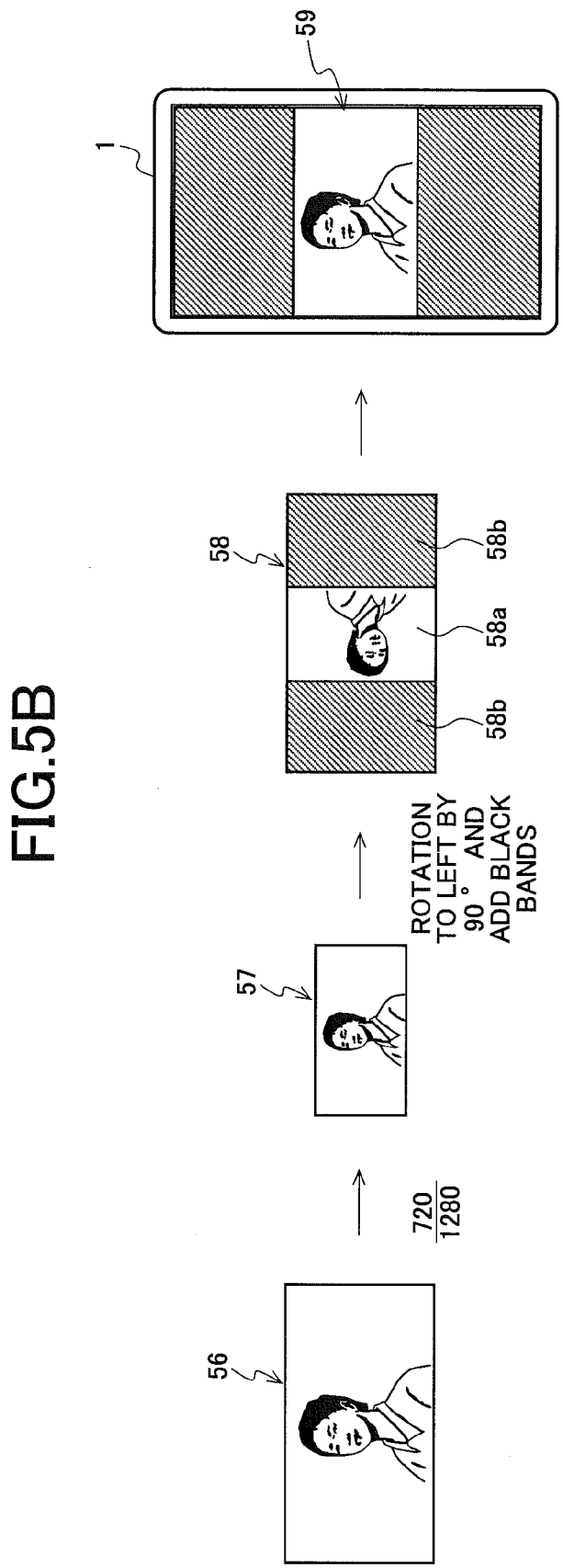
FIG. 5B is a diagram explaining another example of the image conversion processing in the processing of FIG. 4.

Next, description will be given for an example of such processing (including judgment processing of whether or not to rotate a video) with reference to FIG. 4, FIG. 5A and FIG. 5B. FIG. 4 is a flowchart explaining exemplary processing of the display apparatus 1. In addition, FIG. 5A is a diagram explaining an example of image conversion processing in the processing of FIG. 4, and FIG. 5B is a diagram explaining another example of the image conversion processing in the processing of FIG. 4. It is set that processing described here as to the display apparatus 1 is basically executed by the main control portion 10 or the video conversion processing portion 14.

The display apparatus 1 judges whether or not a transmission video from the source device 2 has black bands added (step S1). To described with FIG. 2A to FIG. 2C, the transmission image and an orientation of an image have any state of the image 2P, the image 2L, the image 2PB, the image 2LB and the image 2LBR. However, here, description will be given premising that an orientation of an upper part of an illustrated image is included as state information showing an orientation as it is, without considering the origin Op that is referred to in FIG. 2A to FIG. 2C. Thus, at step S1, judgment is given as YES in the case of videos like the image 2PB, the image 2LB and the image 2LBR and judgment is given as NO in the case of videos like the image 2P and the image 2L.

In the case of YES at step S1, that is, when it is judged as a video with black band parts added, the display apparatus 1 judges whether or not an orientation of the video and an orientation of the display apparatus 1 (an orientation of a screen which is an orientation shown by state information) are matched (step S2). When the orientation of the display screen of the display apparatus 1 is portrait, the image 2PB and the image 2LBR are judged as YES and the image 2LB is judged as NO. To the contrary, when the orientation of the display screen of the display apparatus 1 is landscape, the image 2LB is judged as YES and the image 2PB and the image 2LBR are judged as NO.

In the case of YES at step S2, the display apparatus 1 removes the black band parts and outputs the video by applying scaling processing so as to be maximum on the display screen (step S3). When the orientation of the display screen of the display apparatus 1 is portrait, in either case where the image 2PB or the image 2LBR is transmitted, such a video that an actual image that black band parts are removed from the transmission image is enlarged is to be displayed. When the orientation of the display screen of the display apparatus 1 is landscape, the image 2LB is transmitted and such a video that an actual image that black band parts are removed from the transmission image is enlarged is to be displayed.

In the case of NO at step S2, the display apparatus 1 outputs the video only by applying scaling processing so as to be maximum on the display screen as it is (step S5). When the orientation of the display screen of the display apparatus 1 is portrait, the image 2LB is transmitted and a video that the transmission image is enlarged is to be displayed. When the orientation of the display screen of the display apparatus 1 is landscape, in either case where the image 2PB or the image 2LBR is transmitted, such a video that the transmission image is enlarged is to be displayed.

For example, when the image 2*d* of FIG. 3H or FIG. 3G is transmitted as the image 2PB of FIG. 2B, it is transmitted from the source device 2 as it is (actually, in a state of being reduced to 720p). At the same time, information of an image having black bands and being portrait-oriented is also transmitted as the state information from the source device 2. In this case, YES is given at step S1 because of having black bands, and when the orientation of the display screen of the display apparatus 1 is portrait like FIG. 3H, YES is given at step S2 and the procedure moves to step S3.

Accordingly, in the display apparatus 1, with respect to the received image 2*d* of FIG. 3H, the black band parts 2*db* are removed and only the actual image 2*da* is left, and then, scaling processing is performed to generate the image 1*d* of FIG. 3H for displaying on the video display portion 11 of the display apparatus 1. This makes it possible to have display states of the source device 2 and the display apparatus 1 like FIG. 3H.

On the other hand, when the orientation of the display screen of the display apparatus 1 is landscape like FIG. 3G, NO is given at step S2 and the procedure moves to step S5. Accordingly, in the display apparatus 1, scaling processing is performed for the received image 2*d* of FIG. 3G as it is to generate the image 1*d* of FIG. 3G for displaying on the video display portion 11 of the display apparatus 1. This makes it possible to have display states of the source device 2 and the display apparatus 1 like FIG. 3G.

Further, when the image 2*c* of FIG. 3E or FIG. 3F is transmitted as the image 2LBR of FIG. 2C, this image 2*c* is actually transmitted from the source device 2 in a landscape-oriented state and a state of being reduced to 720p. At the same time, information of an image having black bands and being landscape-oriented is also transmitted as the state information from the source device 2. In this case, YES is given at step S1 because of having black bands, and when the orientation of the display screen of the display apparatus 1 is landscape like FIG. 3F, YES is given at step S2 and the procedure moves to step S3.

Accordingly, in the display apparatus 1, with respect to the received image 2*d* of FIG. 3F (the received image is landscape-oriented like the image 2LBR), the black band parts 2*cb* are removed and only the actual image 2*ca* is left, and then, scaling processing is performed to generate the image 1*c* of FIG. 3F for displaying on the video display portion 11 of the display apparatus 1. This makes it possible to have display states of the source device 2 and the display apparatus 1 like FIG. 3F.

On the other hand, when the orientation of the display screen of the display apparatus 1 is portrait like FIG. 3E, NO is given at step S2 and the procedure moves to step S5. Accordingly, in the display apparatus 1, scaling processing is performed for the received image 2*d* of FIG. 3E (the received image is landscape-oriented like the image 2LBR) as it is to generate the image 1*c* of FIG. 3E for displaying on the video display portion 11 of the display apparatus 1. This makes it possible to have display states of the source device 2 and the display apparatus 1 like FIG. 3E.

In the case of NO at step S1, that is, when it is judged as being the video having no black band parts added, the display apparatus 1 judges whether or not the orientations of the input video and the screen are matched (step S4). When the orientation of the display screen of the display apparatus 1 is portrait, the image 2P is judged as YES and the image 2L is judged as NO. To the contrary, when the orientation of the display screen of the display apparatus 1 is landscape, the image 2L is judged as YES and the image 2P is judged as NO.

In the case of YES at step S4, the display apparatus 1 outputs the video only by applying scaling processing so as to be maximum on the display screen as it is (however, with the orientation of the input video kept) (step S5). When the orientation of the display screen of the display apparatus 1 is portrait, the image 2P is transmitted, and when the orientation of the display screen of the display apparatus 1 is landscape, the image 2L is transmitted, so that such a video that the transmission image is enlarged is to be displayed in both cases.

When the image 2a of FIG. 3B is transmitted as the image 2P of FIG. 2A, this image 2a is actually transmitted from the source device 2 in a landscape-oriented state and a state of being reduced to 720p. At the same time, information of an image having no black bands and being portrait-oriented is also transmitted as the state information from the source device 2. In this case, NO is given at step S1 because of having no black bands, and when the orientation of the display screen of the display apparatus 1 is portrait like FIG. 3B, YES is given at step S4 and the procedure moves to step S5.

Accordingly, in the display apparatus 1, with respect to the received image 2a of FIG. 3B (the received image is landscape-oriented like the image 2L), scaling processing is performed with the orientation of the image remained portrait-oriented (actually, in a state where the transmitted image is rotated 90 degrees to the right) to generate the image 1a of FIG. 3B for displaying on the video display portion 11 of the display apparatus 1. This makes it possible to have display states of the source device 2 and the display apparatus 1 like FIG. 3B.

When the image 2b of FIG. 3C is transmitted as the image 2L of FIG. 2A, it is transmitted as it is from the source device 2 (actually, in a state of being reduced to 720p). At the same time, information of an image having no black bands and being landscape-oriented is also transmitted as the state information from the source device 2. In this case, NO is given at step S1 because of having no black bands, and when the orientation of the display screen of the display apparatus 1 is landscape like FIG. 3C, YES is given at step S4 and the procedure moves to step S5.

Accordingly, in the display apparatus 1, with respect to the received image 2b of FIG. 3C, scaling processing is performed with the orientation of the image remained landscape-oriented to generate the image 1b of FIG. 3C for displaying on the video display portion 11 of the display apparatus 1. This makes it possible to have display states of the source device 2 and the display apparatus 1 like FIG. 3C.

In the case of NO at step S4, the display apparatus 1 judges the orientation of the input video from the state information (step S6). When the orientation of the display screen of the display apparatus 1 is portrait, the image 2L is transmitted, and when the orientation of the display screen of the display apparatus 1 is landscape, the image 2P is transmitted. Description will be given premising that whether or not the input video is portrait is judged at step S6.

In the case of YES at step S6, that is, when the orientation of the input video is portrait like the image 2P, the video is subjected to rotation processing for rotation by 90 degrees to the right and added with black band parts at right and left ends, and then, subjected to scaling processing so as to be maximum on the display screen, followed by video output (step S7).

For example, when an image 51 of FIG. 5A is transmitted as the image 2P, it is actually transmitted from the source device 2 in a landscape-oriented state like an image 52 and a state of being reduced to 720p like an image 53. At the same time, information of an image having no black bands and being portrait-oriented is also transmitted as the state information from the source device 2. In this case, NO is given at step S1 because of having no black bands, and when the orientation of the display screen of the display apparatus 1 is landscape, NO is given at step S4, and YES is given at step S6 because of being the portrait-oriented image.

Accordingly, in the display apparatus 1, the received image 53 is rotated 90 degrees to the right to generate an image 54a, and black band parts 54b are added to right and left ends to generate an image 54 (or by performing rotation by 90 degrees to the right after black band parts are added to upper and lower ends to generate the image 54), followed by scaling processing to generate an image 55 for displaying on the video display portion 11 of the display apparatus 1. This makes it possible to have display states of the source device 2 and the display apparatus 1 like FIG. 3A.

In the case of NO at step S6, that is, when the orientation of the input video is landscape like the image 2L, the video is subjected to rotation processing for rotation by 90 degrees to the left and added with black band parts at right and left ends, and then, subjected to scaling processing so as to be maximum on the display screen, followed by video output (step S8).

For example, when an image 56 of FIG. 5B is transmitted as the image 2L, it is actually transmitted from the source device 2 in a state of being reduced to 720p like an image 57. At the same time, information of an image having no black bands and being landscape-oriented is also transmitted as the state information from the source device 2. In this case, NO is given at step S1 because of having no black bands, and when the orientation of the display screen of the display apparatus 1 is portrait, NO is given at step S4, and NO is given at step S6 because of being the landscape-oriented image.

Accordingly, in the display apparatus 1, the received image 57 is rotated 90 degrees to the left to generate an image 58a, and black band parts 58b are added to right and left ends to generate an image 58 (or by performing rotation by 90 degrees to the left after black band parts are added to upper and lower ends to generate the image 58), followed by scaling processing to generate an image 59 for displaying on the video display portion 11 of the display apparatus 1. This makes it possible to have display states of the source device 2 and the display apparatus 1 like FIG. 3B.

As above, according to the present invention, in the case of displaying a transmission image that is transmitted from the source device 2 on the display apparatus 1, even when black band parts are included in the transmission image, an actual image excluding the black band parts is able to be displayed so as to fit to the orientation of the display screen of the display apparatus 1 and with a size using the entire display screen to a maximum extent. Of course, also in a case where black band parts are not included, it is possible to be displayed so as to fit to the orientation of the display screen and with a size using the entire display screen to a maximum extent.

Further, it is preferable that the display apparatus 1, before receiving the image signal at the receiving portion, notifies the source device 2 of execution-allowed information showing that the display apparatus 1 is able to execute each of rotation processing, scaling processing and black-band processing. Thereby, the source device 2 is only required to transmit the image with the state information without particularly caring about capability of the display apparatus 1. Note that, a function of scaling processing is owned by many display apparatuses, so that particular notification is not required and it may be perceived on the source device 2 side that the function is provided. In other words, when an image of the display screen of the source device 2 is tried to be displayed on a display apparatus having a large screen all the way, it is premised that there is a function for enlarging on the display apparatus side.

(Second Embodiment)

Figure 6:
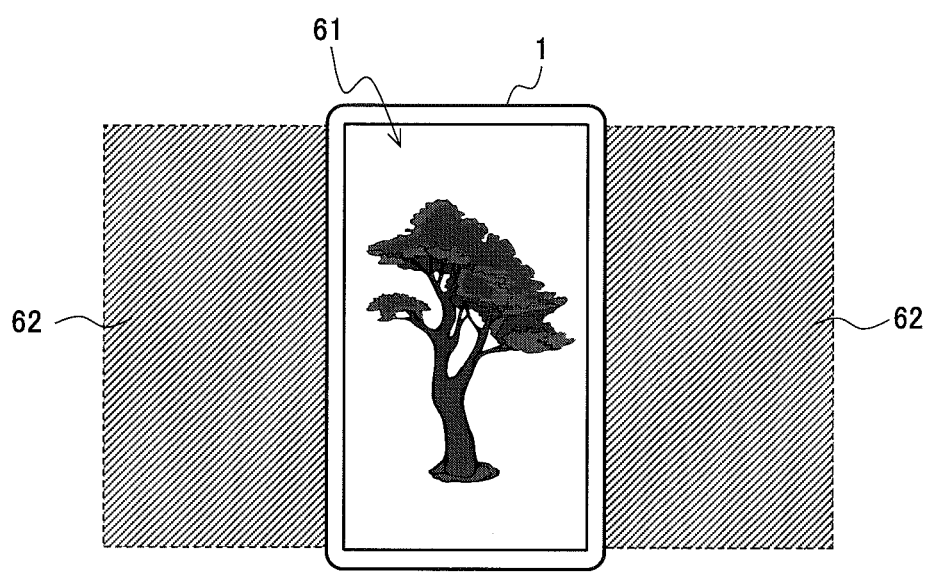
FIG. 6 is a diagram explaining another exemplary processing of the display apparatus in the display system of FIG. 1.

Next, description will be given for another exemplary processing of the display apparatus 1 with reference to FIG. 6, as a second embodiment of the present invention. FIG. 6 is a diagram explaining another exemplary processing of the display apparatus 1.

The display apparatus 1 of the present embodiment is characterized by having a touch function as exemplified in FIG. 1. That is, the display apparatus 1 has a touch sensor that outputs touch information showing a position touched by a user operation at a display portion such as the video display portion 11.

In the case of the display apparatus 1 with the touch function like this, when rotation processing, scaling processing or black-band processing is applied for a transmission image as described above on the display apparatus 1 side, if touch information is transferred as it is, the source device 2 side has a deviation from the display screen of a video display portion 21.

For example, description will be given for a case where processing like FIG. 3H is applied with reference to FIG. 6. As schematically shown in FIG. 6, black band parts 62 that had been in a transmission image are removed and rotation processing is applied so that only an actual image 61 is displayed. Further, since the image 61 does not correspond to the original image 2d of FIG. 3H, even when, for example, an upper part or a lower part, and further a left part or a right part of the image 61 are touched, the source device 2 side does not react as the black band parts 2db are touched. This is because rotation processing and black-band removing processing are applied. Moreover, when black band parts are added on the display apparatus 1 side, the black band parts are treated as dead zones on the display apparatus 1 side, while a corresponding part originally exists in the transmission image, so that deviation is caused.

In order to eliminate such deviation, when touch information is output from the touch sensor, depending on whether or not each of rotation processing, scaling processing and black-band processing (insertion/removal) has been executed on the display apparatus 1 side for a display image displayed on the display portion such as the video display portion 21, the display apparatus 1 of the present embodiment performs coordinate conversion so that a coordinate of the touch information coincides with (matches) that of the transmission image, and notifies the source device 2 of the touch information after the coordinate conversion.

The coordinate conversion is able to be executed by performing, depending on how the image is converted, reverse conversion thereof. Though description will not be given by taking a specific example because it is simple geometric calculation, the coordinate of touch is conformed to the original transmission image, and when the black band parts are removed, an amount of the removed black band parts is added, and when the black band parts are added, an amount of the added part is subtracted, and then, when rotation processing is applied, values of an X coordinate and a Y coordinate are exchanged to perform origin coordinate conversion. As the scaling processing, processing for reducing the coordinate may be applied in the case of enlargement.

Then, when a video that the display screen of the source device 2 is subjected to mirroring is transferred to the display apparatus 1 in the MHL cable 3 as described above, the touch information detected by the display apparatus 1 is notified to the source device 2 in bidirectional data communication of a CBUS line of the MHL cable 3. This makes it possible for a user to operate the source device 2 by touch in the display apparatus 1 in which a video of the source device 2 is displayed by mirroring.

(Third Embodiment)

Next, description will be given for another exemplary processing of the display system of FIG. 1 with reference to FIG. 7, FIG. 8A and FIG. 8B, as a third embodiment of the present invention. FIG. 7 is a flowchart explaining another exemplary processing of the display apparatus 1. In addition, FIG. 8A and FIG. 8B are diagrams explaining an example of negotiation processing between devices applicable in the display system of FIG. 1.

In the first and second embodiments, a case where an orientation of an actual image in a transmission image is necessarily matched with an orientation of the display apparatus 1 whether or not the source device 2 has black band parts added is shown. In the present embodiment, however, an orientation in which the display apparatus 1 is installed (orientation of the display screen) is able to be set by user input to the source device 2 side.

Of course, though a user may be caused to operate the source device 2 for direct input setting, when the source device 2 is able to be operated from the display apparatus 1 by touch like in the second embodiment, it is the same in terms of that the orientation of the display screen of the display apparatus 1 is set by a UI on the display apparatus 1 side, while it is also possible to set the orientation of the display screen of the display apparatus 1 with respect to the source device 2 in a state where the display screen of the source device 2 is displayed. In any case, on the source device 2 side, separately from its own screen orientation, the orientation of the display screen of the display apparatus 1 may be held, for example, in the screen orientation storage portion 28.

When the orientation of the display screen of the display apparatus 1, which is held, and the present orientation of the display screen of the source device 2 does not match, then, the source device 2 may output an image with black band parts added. When it is judged that the black band parts are added at the sight of state information on the display apparatus 1 side, a video may be displayed as it is (with scaling processing applied as necessary).

An example of such processing will be described with reference to FIG. 7. First, the display apparatus 1 judges whether or not a transmission video has black band parts added, in the same manner as step S1 of FIG. 4 (step S11), and when black band parts are added (in the case of YES), it is regarded that video processing has been performed on the source device 2 side, and scaling processing for using the display screen to a maximum extent as it is applied for outputting a video (step S12). Processing to be performed in the case where no black band parts are added (steps S13 to S16 performed in the case of NO at step S11) is the same as steps S4 to S8 of FIG. 4, previously described.

Further, it is also possible in the present embodiment to configure so as to use not only the black-band processing function but also the rotation function on the source device 2 side. In order to enable it, a display apparatus serving as a sink device like the display apparatus 1 notifies the source device 2 side in advance that whether or not rotation processing and black-band processing are allowed to be executed by its own. Note that, the function of scaling processing is owned by many display apparatuses, so that particular notification is not required and it may be perceived that the function is provided.

The example has been taken in the first embodiment that the display apparatus 1, before receiving an image signal at the receiving portion, notifies the source device 2 of execution-allowed information showing that the display apparatus 1 is able to execute each of rotation processing, scaling processing and black-band processing (for example, which are set as first, second and third execution-allowed information, respectively). In the same manner as this notification, the display apparatus may notify the source device 2 of execution-allowed information as to only processing that is allowed to be executed. Note that, as described in the first embodiment, the second execution-allowed information may not be notified.

Actually, since it is required in a display apparatus to use a high-cost integrated circuit for having the functions of rotation processing and black-band processing like the display apparatus 1, some display apparatuses using an inexpensive integrated circuit may have no functions of rotation processing nor black-band processing. Therefore, the display apparatus 1 may notify the source device 2 of information showing that the functions of rotation processing and black-band processing (and scaling processing) are provided.

This makes it possible for the source device 2 to know capability of not only the display apparatus 1 capable of all three processing but also a display apparatus that is connected. Then, the source device 2 having received this notification may execute rotation processing and black-band processing on the source device 2 side as necessary according to a content shown by the notification.

That is, the source device 2 may convert an image to be transmitted according to whether or not the first execution-allowed information, (the second execution-allowed information) and the third execution-allowed information are notified from the display apparatus, transmit a signal of the image after conversion to the display apparatus as an image signal, and transmit, with the image signal, state information (information showing an orientation of an upper part or a lower part of the transmission image indicated by the image signal and presence/absence of black band parts in the transmission image) to the display apparatus. Then, on the display apparatus side, in the same manner as the display apparatus 1 (though, impossible processing among the three processing may not be executed), required processing among processing that is allowed to be executed is executed according to the state information and the detection result of the orientation detecting portion 19, resulting in an appropriate screen configuration.

Though specific description for this processing will be omitted, a function that is not on the display apparatus side is supported on the source device 2 side, and therefore it is possible to correspond to any case as described in FIG. 3A to FIG. 3H.

Next, description will be given for an example of negotiation processing between devices applicable in the display system of FIG. 1, with reference to FIG. 8A and FIG. 8B. The negotiation processing described here is processing also including notification of the execution-allowed information as described above to the source device 2, but this is nothing more than an example and other processing methods are also able to be adopted.

Note that, if the display apparatus 1 is capable of the three processing (rotation processing, scaling processing and black-band processing) according to the state information notified from the source device 2, an appropriate screen is able to be configured on the display apparatus 1 side only by setting simply to notify the state information from the source device 2, without executing the negotiation processing itself described here. This point is as described in the first and second embodiments.

The processing exemplified below is negotiation processing, between the source device 2 and a display apparatus like the display apparatus 1, concerning setting of screen output from the source device 2 to the display apparatus. Since a transmission image from the source device 2 is a landscape image with 1280×720 or the like as described above, information of length and width of an actual image, as described as a part of the state information, needs to be provided to the display apparatus side. Further, in order to correspond to black-band processing on the display apparatus side, flags to be exchanged at a time of negotiation need to be added.

Flags that are notified to the source device 2 from the display apparatus side are (I) a flag for setting length and width of the display apparatus and (II) a capability flag of the display apparatus. When length and width of a display screen are set on the display apparatus side, the flag (I) is notified to the source device 2. In the example of FIG. 8A and FIG. 8B, it is set that no setting is "0", a case of a landscape-oriented display screen is "1", a case of a portrait-oriented display screen is "2", and notification is also performed in the case of no setting.

Moreover, whether or not addition or removal of black band parts is able to be supported on the display apparatus side is notified to the source device 2 with the flag (II) above. In the example of FIG. 8A and FIG. 8B, it is set that a case where only full-screen display is allowed is "0", a case where in addition to full-screen display, a function for adding black band parts on the right and left sides in portrait display is also provided is "1", a case where in addition to full-screen display, a function for adding black band parts on the upper and lower sides in landscape display is also provided is "2", and a case where in addition to full-screen display the function for adding black band parts on the right and left sides in portrait display and the function for adding black band parts on the upper and lower sides in landscape display are provided is "3".

Flags that are notified from the source device 2 side to the display apparatus are (III) a flag for setting length and width on the source device 2 side and (IV) a flag of an output screen from the source device 2. Setting of length and width on the source device 2 side is notified to the display apparatus with the flag (III). In the example of FIG. 8A and FIG. 8B, it is set that a case of display screen that is fixed to be landscape-oriented is "1", a case of display screen that is fixed to be portrait-oriented is "2", and a case of no setting is "0".

Moreover, whether a screen output from the source device 2 is portrait display or landscape display is notified to the display apparatus with the flag (IV). In the example of FIG. 8A and FIG. 8B, it is set that a case of landscape-oriented (landscape display is a correct position when viewed from a user) is "0" and a case of portrait-oriented (portrait display is a correct position when viewed from the user) is "1". The flag (IV) corresponds to information showing an orientation of an upper part or a lower part of the transmission image among the state information. In addition, the flag (III) corresponds to information of presence/absence of black band parts among the state information considering the flag (IV).

Description will be given for procedure of the negotiation processing. First, (1) the display apparatus transmits an initial negotiation packet to the source device 2 by adding the flags (I) and (II).

Next, (2) the source device 2 determines a screen state to be output based on information shown by the flags (I) and (II) and a state of inside of the source device 2 (length and width setting menu of the source device side and display orientation setting of an application [Orientation setting]).

At a time of this determination, when length and width setting are set in both (I) above on the display apparatus side and (III) above on the source device 2 side, setting of (III) above on the source device 2 side has priority.

Moreover, the screen state is typically determined to output with a full-screen like the image 2L of FIG. 2A according to length and width setting. On the other hand, in a case where length and width setting is "1" of landscape-fixed as well as an application is portrait-fixed and a case where (II) above is that black bands on right and left are not supported (that is, "0" or "2"), processing except for the last scaling processing (and display processing in accordance with the orientation of the display screen) among the processing exemplified and described in FIG. 5A is performed on the source device 2 side. That is, by reducing to 720/1280 on the source device 2 side to put black band parts on right and left after rotation to the right by 90 degrees, followed by output like the image 2PB of FIG. 2B.

Moreover, in a case where length and width setting is "2" of portrait-fixed as well as an application is landscape-fixed, and (II) above is that black bands on top and bottom are not supported (that is, "0" or "1"), processing except for the last scaling processing (and display processing in accordance with the orientation of the display screen) among the processing exemplified and described in FIG. 5B is performed on the source device 2 side. That is, by reducing to 720/1280 on the source device 2 side to put black band parts on right and left after rotation to the left by 90 degrees, followed by output like the image 2LBR of FIG. 2C. Note that, when such processing is impossible, output may be performed on the entire screen which is landscape.

Next, (3) the source device 2 responds to the display apparatus with a negotiation packed with the flags (III) and (IV) added as the state of the screen to be output. Note that, when the state of screen output and setting are changed on the source device 2 side, the display apparatus may be given a notice in the negotiation packet of (3) above in each case.

Subsequently, (4) the display apparatus judges required support on the display apparatus side (screen rotation/black-band addition) from the information shown by the flags (III) and (IV) and the flags (I) and (II), which are the state of its own for screen display. Here, full-screen display is typically performed on the display apparatus side with the input screen remained. For example, regardless of the flag (II), neither the source device 2 nor the display apparatus have length and width setting, full-screen display is performed with the display state of the source device 2 remained. Note that, when the flag (III) is not able to be output in the source device 2, output may be performed based on the flag (I) as to the orientation in which the user rotates the display apparatus.

Description will be given for a case where length and width setting is "1" of landscape-fixed, and (IV) above is "1" of portrait-oriented, as well as (II) above is that black bands on right and left are able to be supported (that is, "1" or "3"). This case is a case shown with a mark ★ in FIG. 8A and FIG. 8B, and as exemplified and described in FIG. 5A, by reducing to 720/1280 on the display apparatus side to put black band parts on right and left after rotation to the right by 90 degrees, followed by display.

Description will be given for a case where length and width setting is "2" of portrait-fixed, and (IV) above is "0" of landscape-oriented, as well as (II) above is that black bands on top and bottom are able to be supported (that is, "2" or "3"). This case is a case shown with a mark ♦ in FIG. 8A and FIG. 8B, and as exemplified and described in FIG. 5B, by reducing to 720/1280 on the display apparatus side to put black band parts on right and left after rotation to the left by 90 degrees, followed by display.

In addition, in the examples above, description has been given premising that rotation of the display apparatus is only by 0 degree or 90 degrees and not by −90 degree or the like. However, by adding one more rotation flag, it is possible to correspond to rotation in four directions.

(Others)

As above, though description has been given for the display apparatus, the source device and the display system according to the present invention, as exemplified for a flow of processing with the flowchart, the present invention may make a form as a display method in a display apparatus that includes a display portion, an orientation detecting portion for detecting an orientation of an upper part or a lower part of a display screen of the display portion, a receiving portion for receiving an image signal transmitted from a source device, and an image processing portion, and displays an image processed by the image processing portion on the display portion, and a form as a program that causes a computer (control portion of the display apparatus) to execute the display method.

This display method has a receiving step that the receiving portion receives, together with the image signal, state information showing an orientation of an upper part or a lower part of a transmission image indicated by the image signal and presence/absence of black band parts in the transmission image, and a processing step that the image processing portion applies, to the transmission image, any one or more processings among rotation processing for rotation such that the orientation of the upper part or the lower part of the display screen coincides with the orientation of the upper part or the lower part of the transmission image received at the receiving step, scaling processing for performing scaling so as to perform display on the display screen to a maximum extent with an aspect ratio maintained, and black-band processing for adding or removing black band parts, according to a detection result of the orientation detecting portion and the state information received at the receiving step. Other applications are as described for the display apparatus, and description thereof will be omitted.

In other words, the above-described program is a program for causing a computer provided with the display portion and the orientation detecting portion to execute this display method. That is, this program is a program for causing the computer to execute a receiving step for receiving, together with the image signal, state information showing an orientation of an upper part or a lower part of a transmission image indicated by the image signal and presence/absence of black band parts in the transmission image, and a processing step for applying, to the transmission image, any one or more processings among rotation processing for rotation such that the orientation of the upper part or the lower part of the display screen coincides with the orientation of the upper part or the lower part of the transmission image received at the receiving step, scaling processing for performing scaling so as to perform display on the display screen to a maximum extent with an aspect ratio maintained, and black-band processing for adding or removing black band parts, according to a detection result of the orientation detecting portion and the state information received at the receiving step. Other applications are as described for the display apparatus, and description thereof will be omitted.

Further, the present invention may take a form as a transmission method in a source device that transmits an image signal to the display apparatus and a form as a program for causing a computer (control portion of the source device) to execute the transmission method. This transmission method has a step of transmitting, together with the image signal, state information showing an orientation of an upper part or a lower part of a transmission image indicated by the image signal and presence/absence of black band parts in the transmission image. Other applications are as described for the source device, and description thereof will be omitted.

In other words, the above-described program of the source device side is a program for causing a computer to execute this transmission method. That is, this program is a program for causing the computer to execute a step of transmitting, together with the image signal, state information showing an orientation of an upper part or a lower part of a transmission image indicated by the image signal and presence/absence of black band parts in the transmission image. Other applications are as described for the source device, and description thereof will be omitted.

As above, according to the present invention, in the case of displaying a transmission image that is transmitted from a source device on a display apparatus, even when black band parts are included in the transmission image, an actual image excluding the black band parts is able to be displayed so as to fit to an orientation of a display screen of the display apparatus and with a size using the entire display screen to a maximum extent.

The invention claimed is:

1. A display apparatus, comprising:
a display portion;
an orientation detecting portion for detecting an orientation of an upper part or a lower part of a display screen of the display portion;
a receiving portion for receiving an image signal transmitted from a source device; and
an image processing portion, and the display apparatus displaying an image processed by the image processing portion on the display portion, wherein
the receiving portion receives, together with the image signal, state information showing an orientation of an upper part or a lower part of a transmission image indicated by the image signal and presence/absence of black band parts in the transmission image, and
the image processing portion applies, to the transmission image, at least one of rotation processing and scaling processing in combination with black-band processing, any one or more processings among rotation processing for rotation such that the orientation of the upper part or the lower part of the display screen coincides with the orientation of the upper part or the lower part of the transmission image received at the receiving portion, scaling processing for performing scaling so as to perform display on the display screen to a maximum extent with an aspect ratio maintained, and black-band processing for adding or removing black band parts, according to a detection result of the orientation detecting portion and the state information received at the receiving portion, wherein
a touch sensor that outputs touch information showing a touched position by a user operation is included in the display portion, and
when the touch information is output from the touch sensor, depending on whether or not any one of the rotation processing, the scaling processing and the black-band processing has been executed for a display image displayed on the display portion, the display apparatus performs coordinate conversion so that a coordinate of the touch information coincides with that of the transmission image, and outputs the touch information converted by the coordinate conversion to allow a user of the display apparatus to operate the source device based on the touched position.

2. The display apparatus as defined in claim 1, wherein before receiving the image signal at the receiving portion, the display apparatus notifies the source device of execution-allowed information showing that the display apparatus is able to execute each of the rotation processing, the scaling processing and the black-band processing, or execution-allowed information showing that the display apparatus is able to execute each of the rotation processing and the black-band processing.

3. A source device that transmits an image signal, to a display apparatus, together with state information showing an orientation of an upper part or a lower part of a transmission image indicated by the image signal and presence/absence of black band parts in the transmission image, wherein the display apparatus, includes,
a display portion;
an orientation detecting portion for detecting an orientation of an upper part or a lower part of a display screen of the display portion;
a receiving portion for receiving an image signal transmitted from a source device; and
an image processing portion, and displays an image processed by the image processing portion on the display portion, wherein
the receiving portion receives, together with the image signal, state information showing an orientation of an upper part or a lower part of a transmission image indicated by the image signal and presence/absence of black band parts in the transmission image, and
the image processing portion applies, to the transmission image, at least one of rotation processing and scaling processing in combination with black-band processing, any one or more processings among rotation processing for rotation such that the orientation of the upper part or the lower part of the display screen coincides with the orientation of the upper part or the lower part of the transmission image received at the receiving portion, scaling processing for performing scaling so as to perform display on the display screen to a maximum extent with an aspect ratio maintained, and black-band processing for adding or removing black band parts, according to a detection result of the orientation detecting portion and the state information received at the receiving portion, wherein a touch sensor that outputs touch information showing a touched position by a user operation is included in the display portion, and when the touch information is output from the touch sensor, depending on whether or not any one of the rotation processing, the scaling processing and the black-band processing has been executed for a display image displayed on the display portion, the display apparatus performs coordinate conversion so that a coordinate of the touch information coincides with that of the transmission image, and outputs the touch information converted by the coordinate conversion to allow a user of the display apparatus to operate the source device based on the touched position.

4. A display apparatus, comprising:

a display portion;

an orientation detecting portion for detecting an orientation of an upper part or a lower part of a display screen of the display portion;

a receiving portion for receiving an image signal transmitted from a source device; and an image processing portion, and the display apparatus displaying an image processed by the image processing portion on the display portion, wherein the receiving portion receives, together with the image signal, state information showing an orientation of an upper part or a lower part of a transmission image indicated by the image signal and presence/absence of black band parts in the transmission image, and the image processing portion applies, to the transmission image, any one or more processings among rotation processing for rotation such that the orientation of the upper part or the lower part of the display screen coincides with the orientation of the upper part or the lower part of the transmission image received at the receiving portion, scaling processing for performing scaling so as to perform display on the display screen to a maximum extent with an aspect ratio maintained, and black-band processing for adding or removing black band parts, according to a detection result of the orientation detecting portion and the state information received at the receiving portion, wherein before receiving the image signal at the receiving portion, the display apparatus outputs a signal notifying the source device of execution-allowed information showing that the display apparatus is able to execute each of the rotation processing, the scaling processing and the black-band processing, or execution-allowed information showing that the display apparatus is able to execute each of the rotation processing and the black-band processing, allowing the source device to transmit the image signal and the state information based on the execution-allowed information without taking a capability of the display apparatus into consideration.

\* \* \* \* \*